R. H. BUTER.
MECHANICAL CASHIER.
APPLICATION FILED AUG. 14, 1914.
1,202,795.
Patented Oct. 31, 1916.
14 SHEETS—SHEET 1.
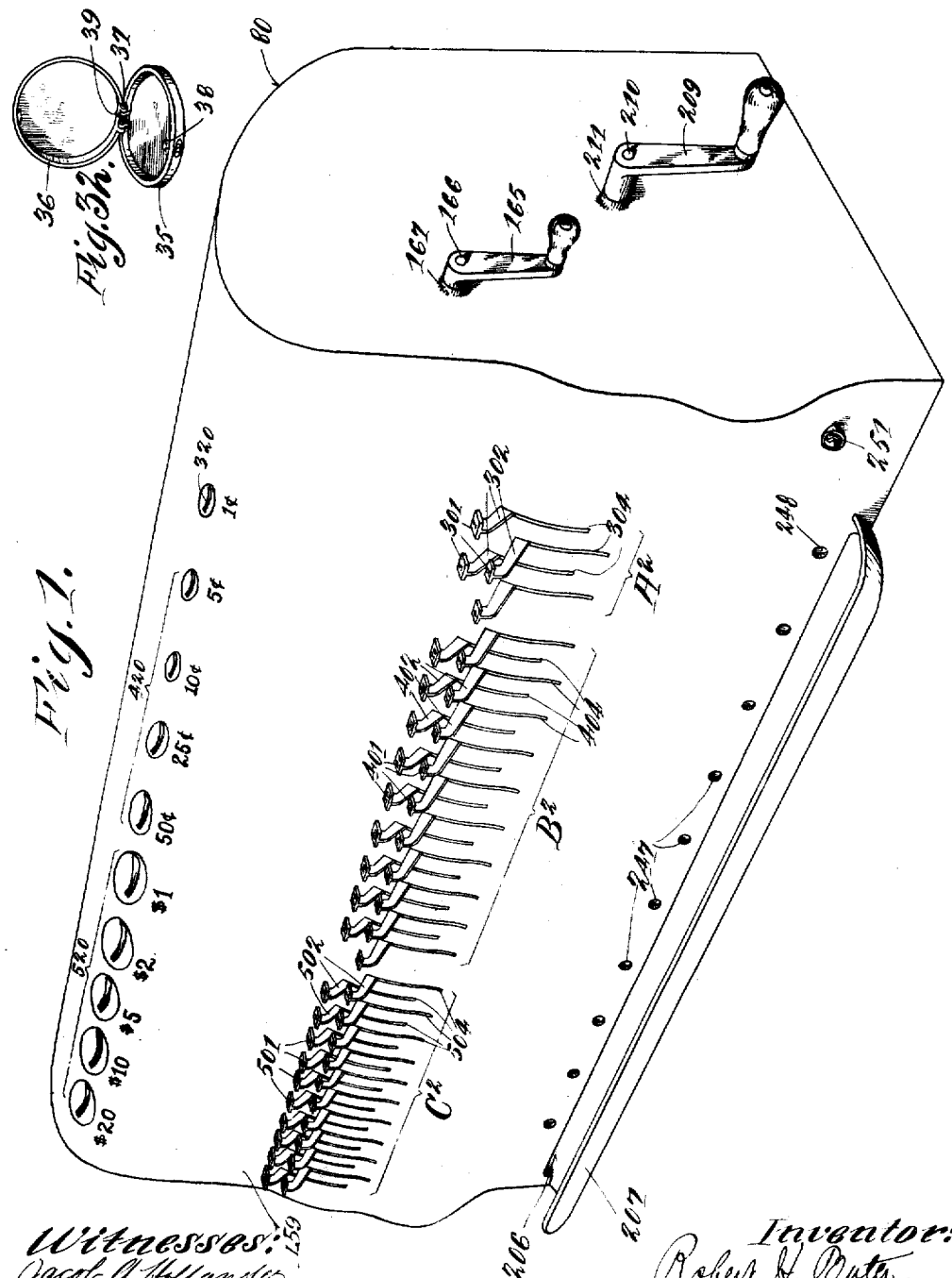
Witnesses:
Jacob A. Hollander
Theresa M. Silber
Inventor:
Robert H. Buter,
by H. R. Herbster
his Attorney

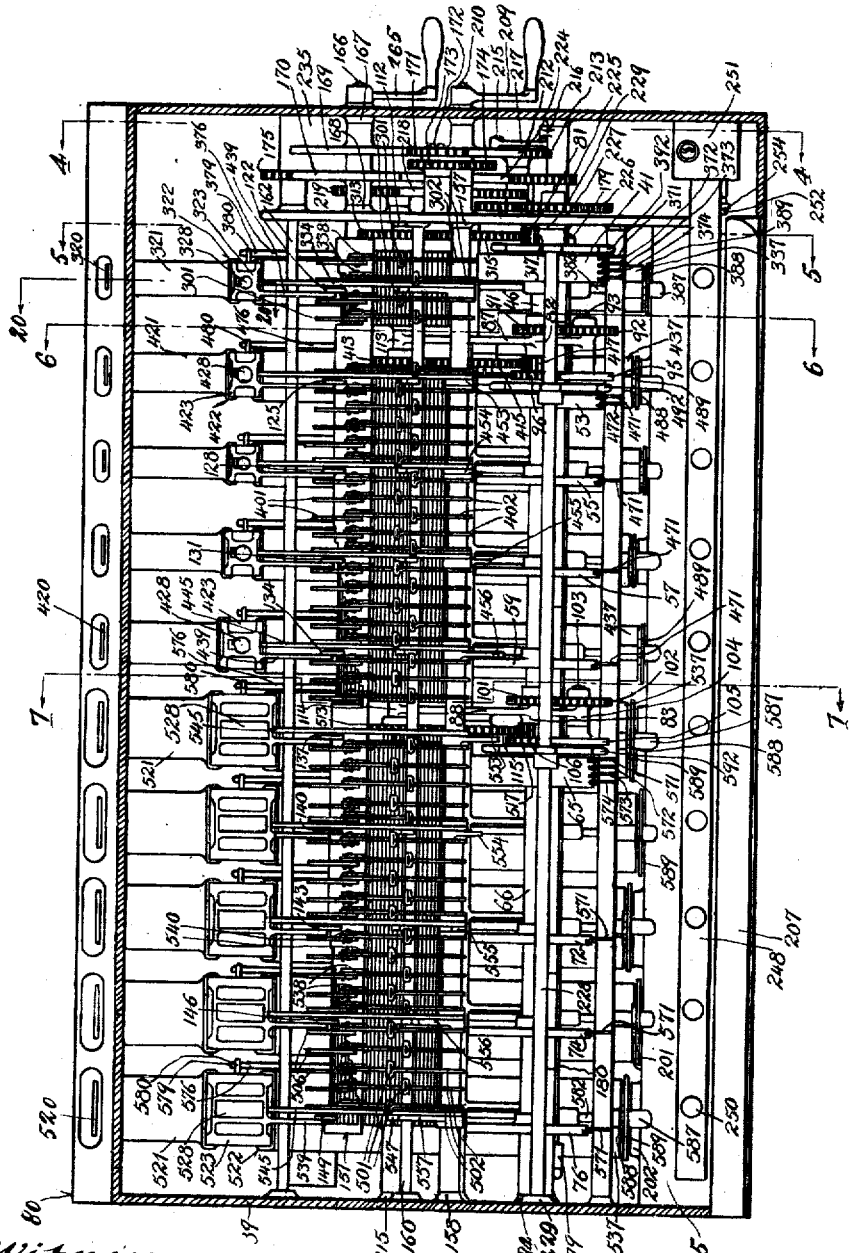

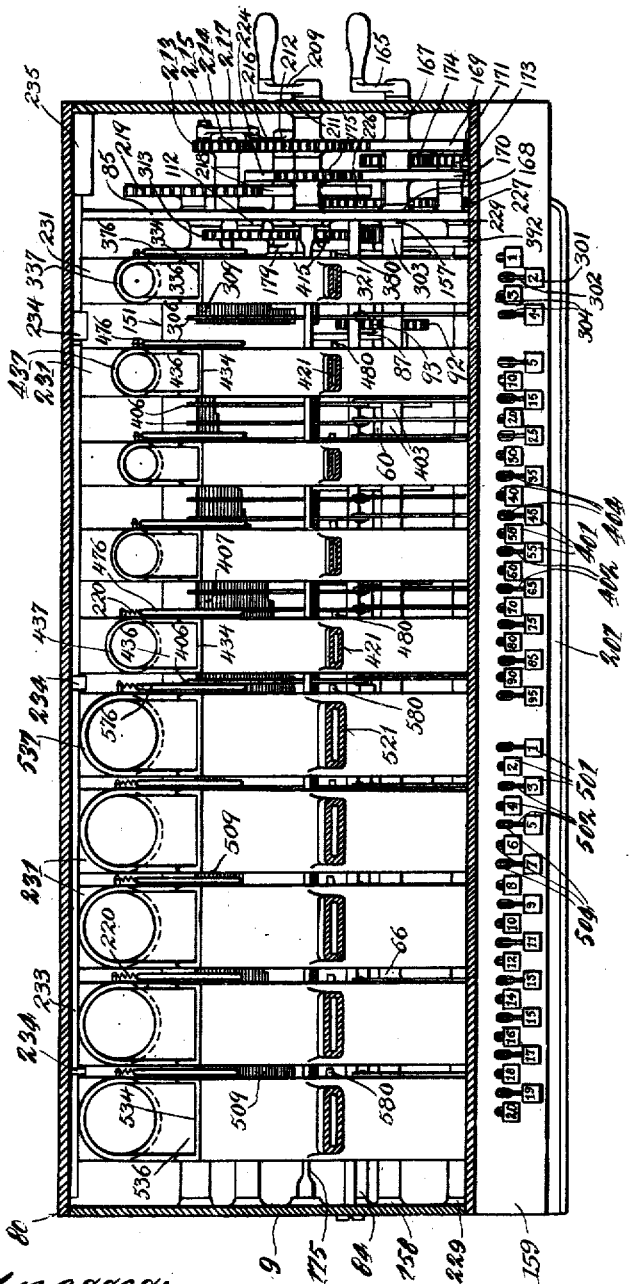

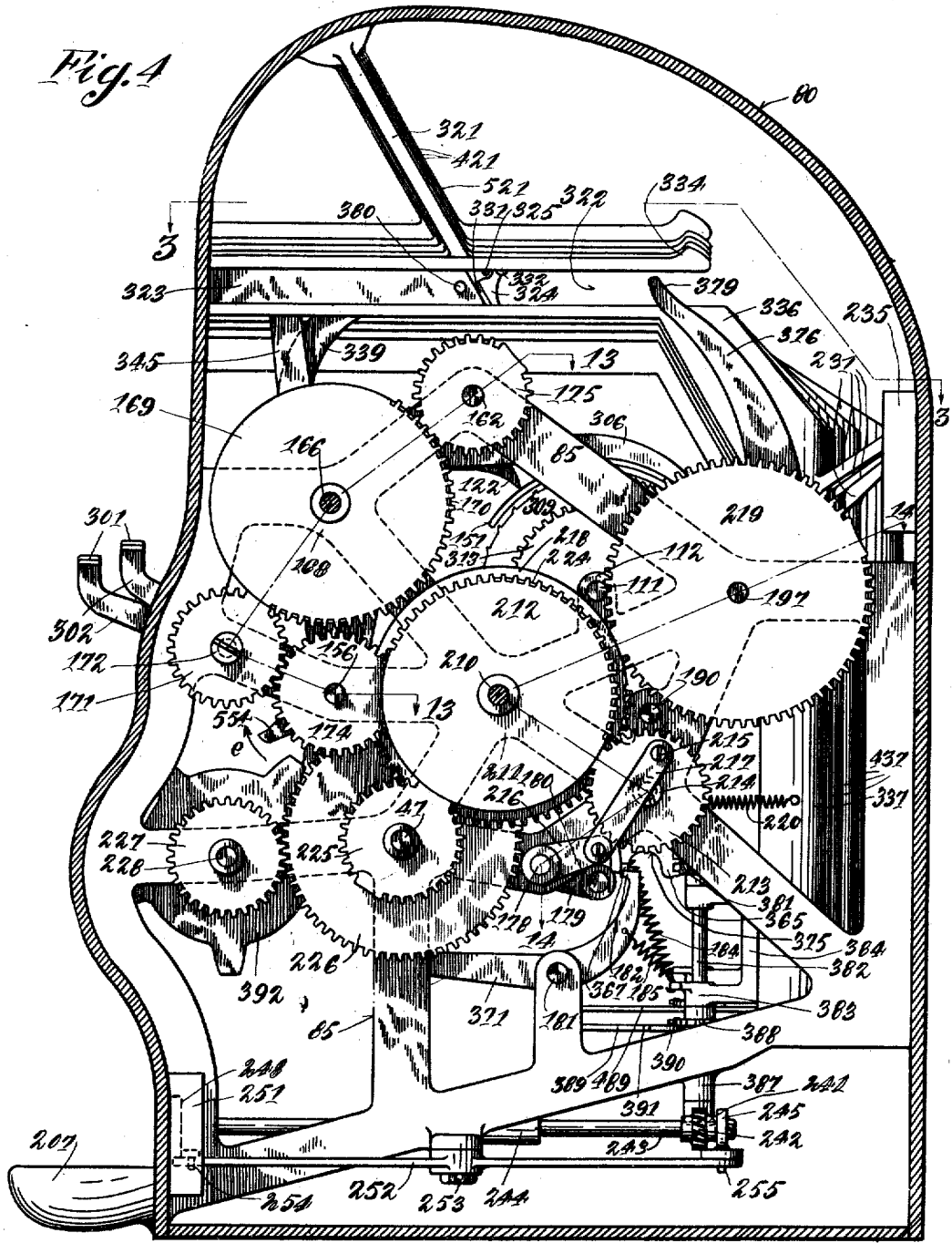

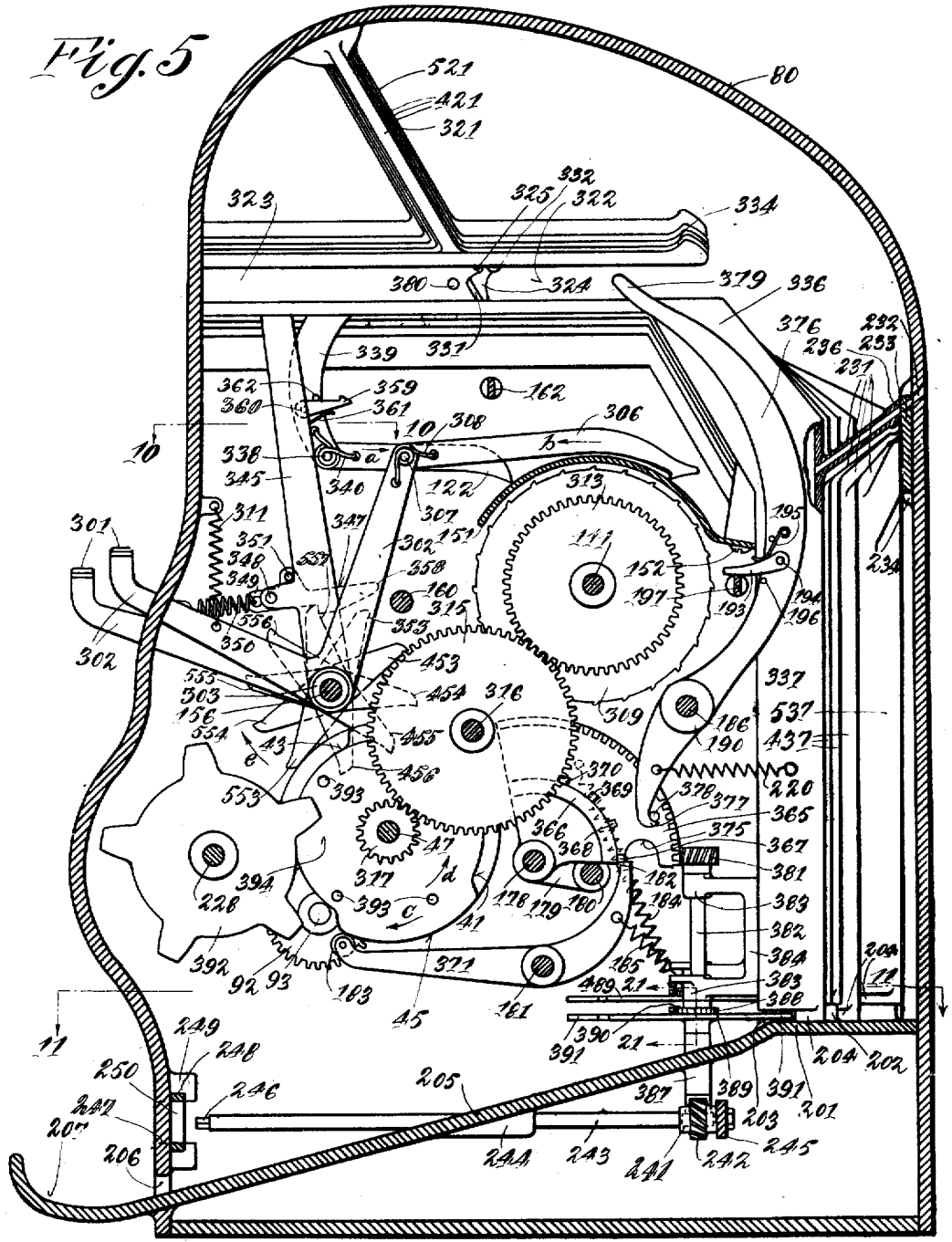

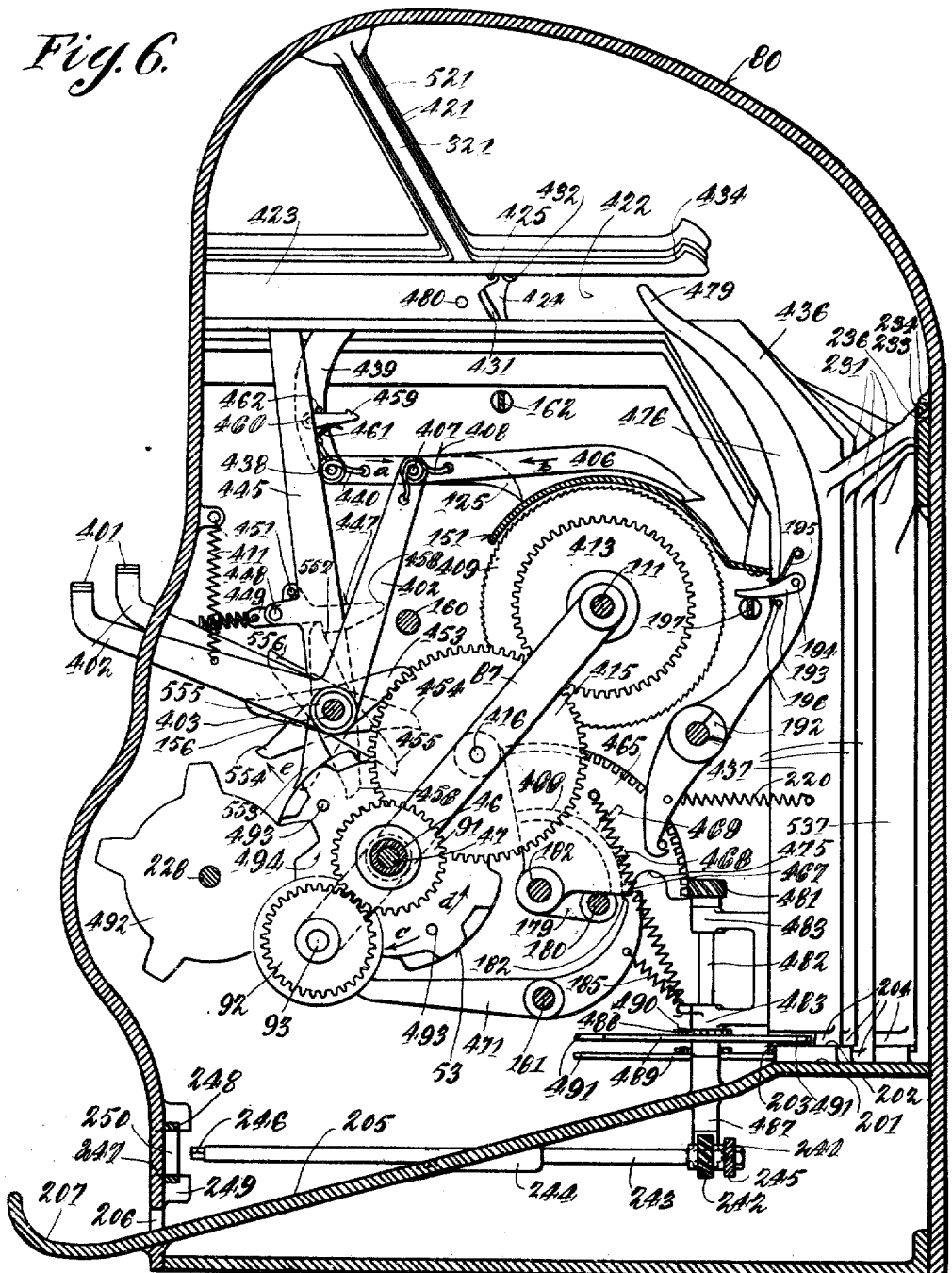

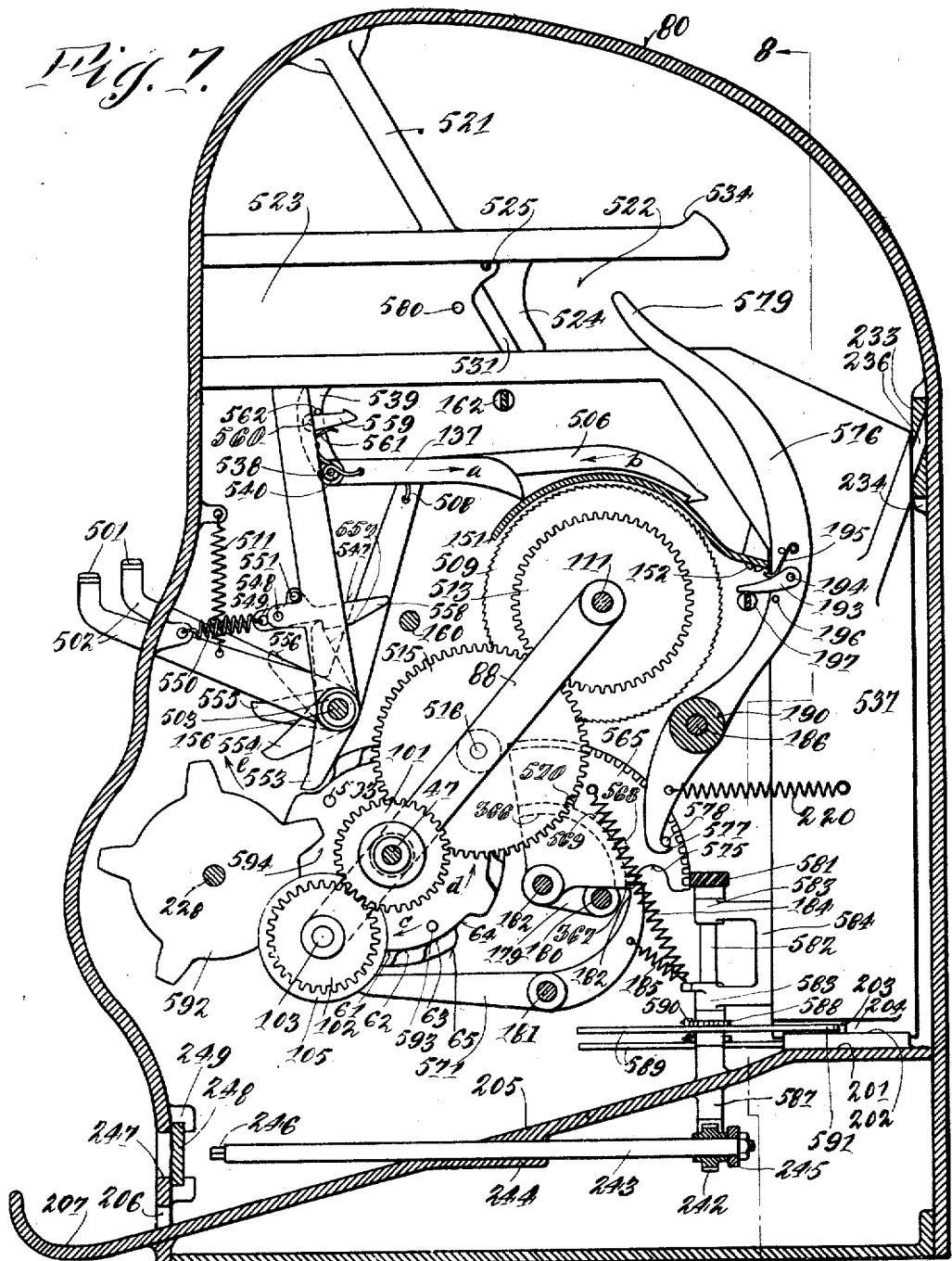

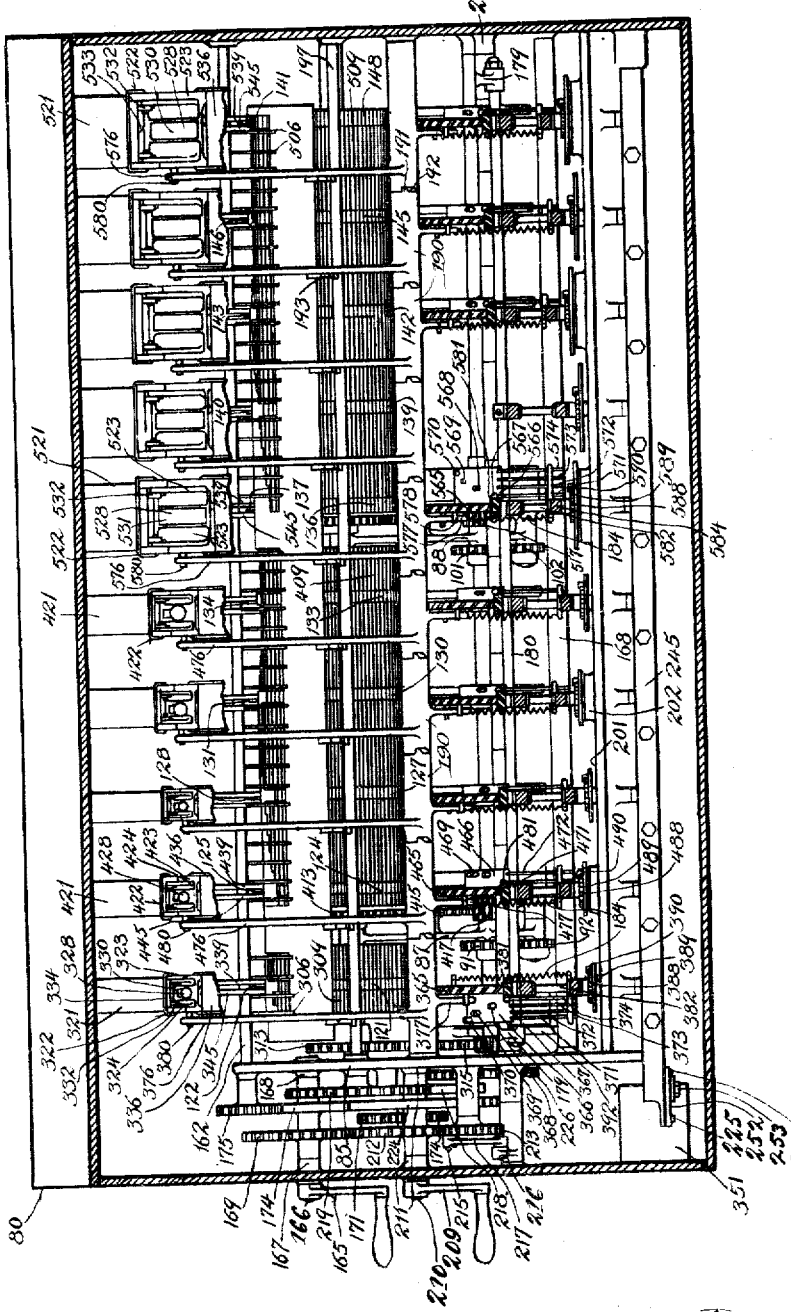

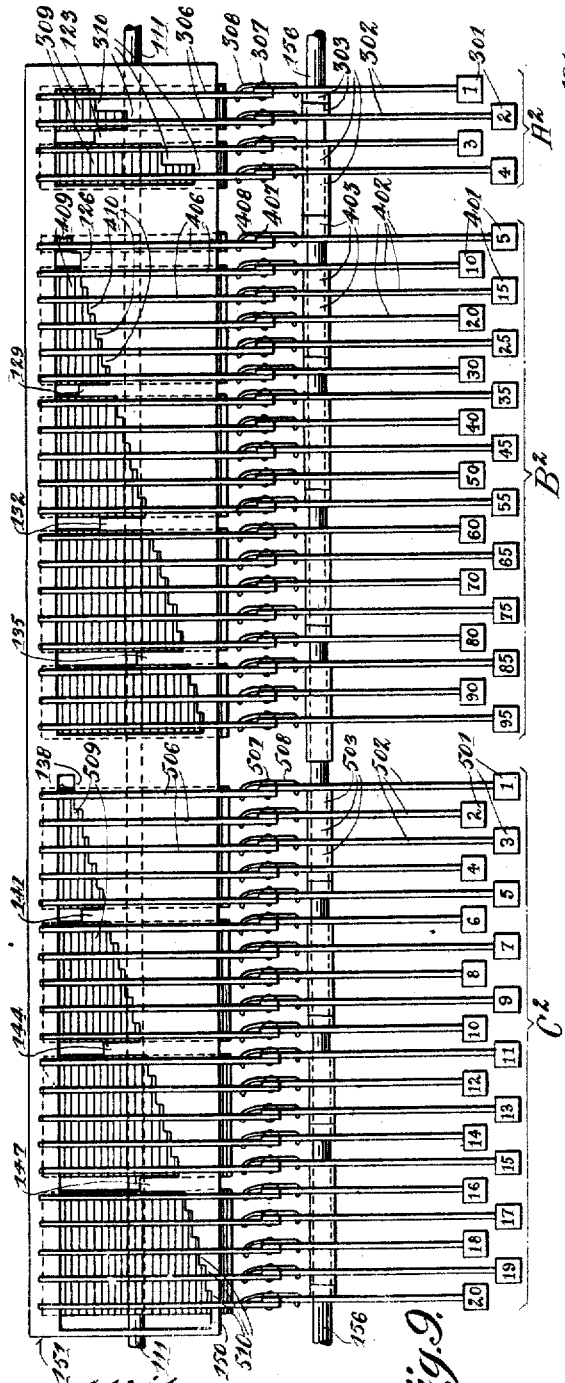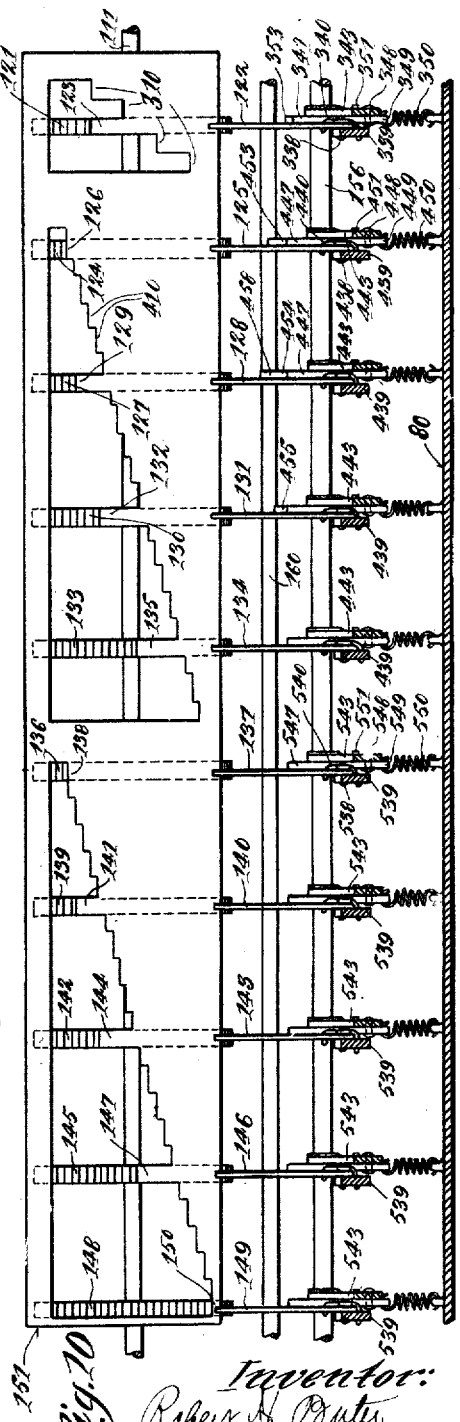

R. H. BUTER.
MECHANICAL CASHIER.
APPLICATION FILED AUG. 14, 1914.
1,202,795.
Patented Oct. 31, 1916.
14 SHEETS—SHEET 10.
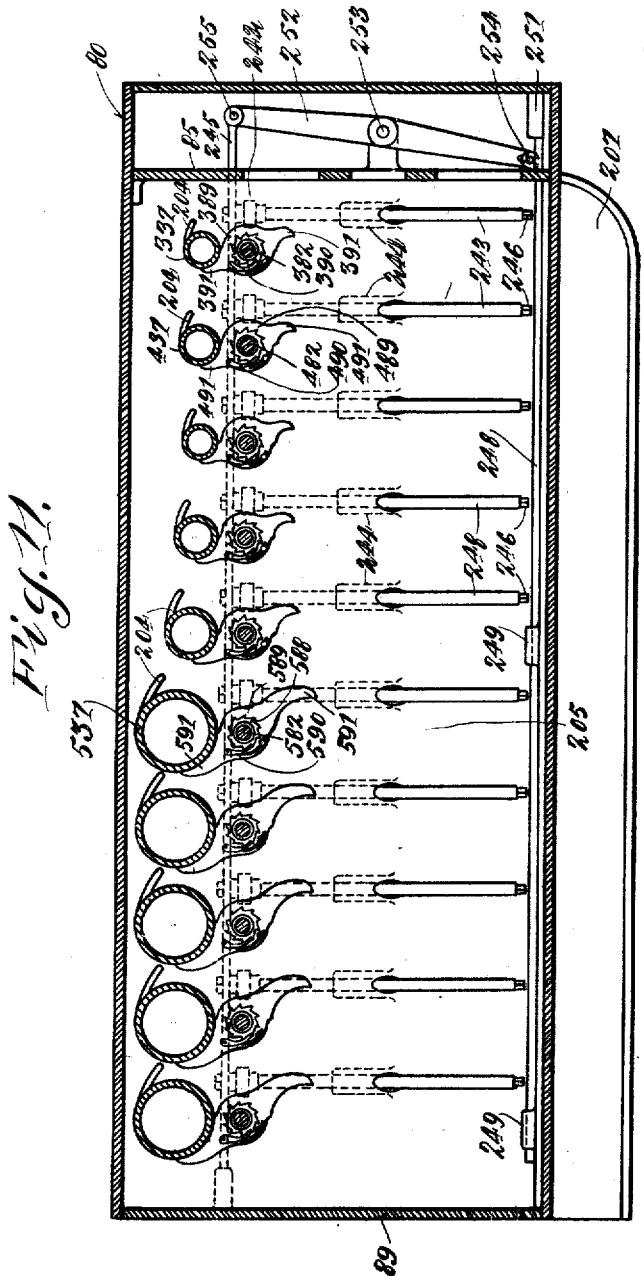
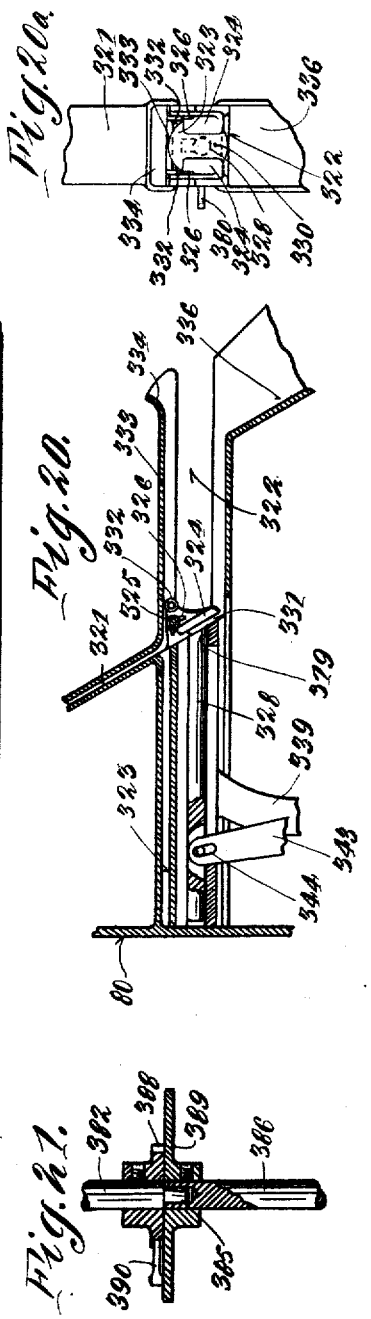
Witnesses:
Jack A. Hollander
Theresa M. Silber
Inventor:
Robert H. Buter,
By A. F. Liebseb
His Attorney.

R. H. BUTER.
MECHANICAL CASHIER.
APPLICATION FILED AUG. 14, 1914.
1,202,795.
Patented Oct. 31, 1916.
14 SHEETS—SHEET 11.
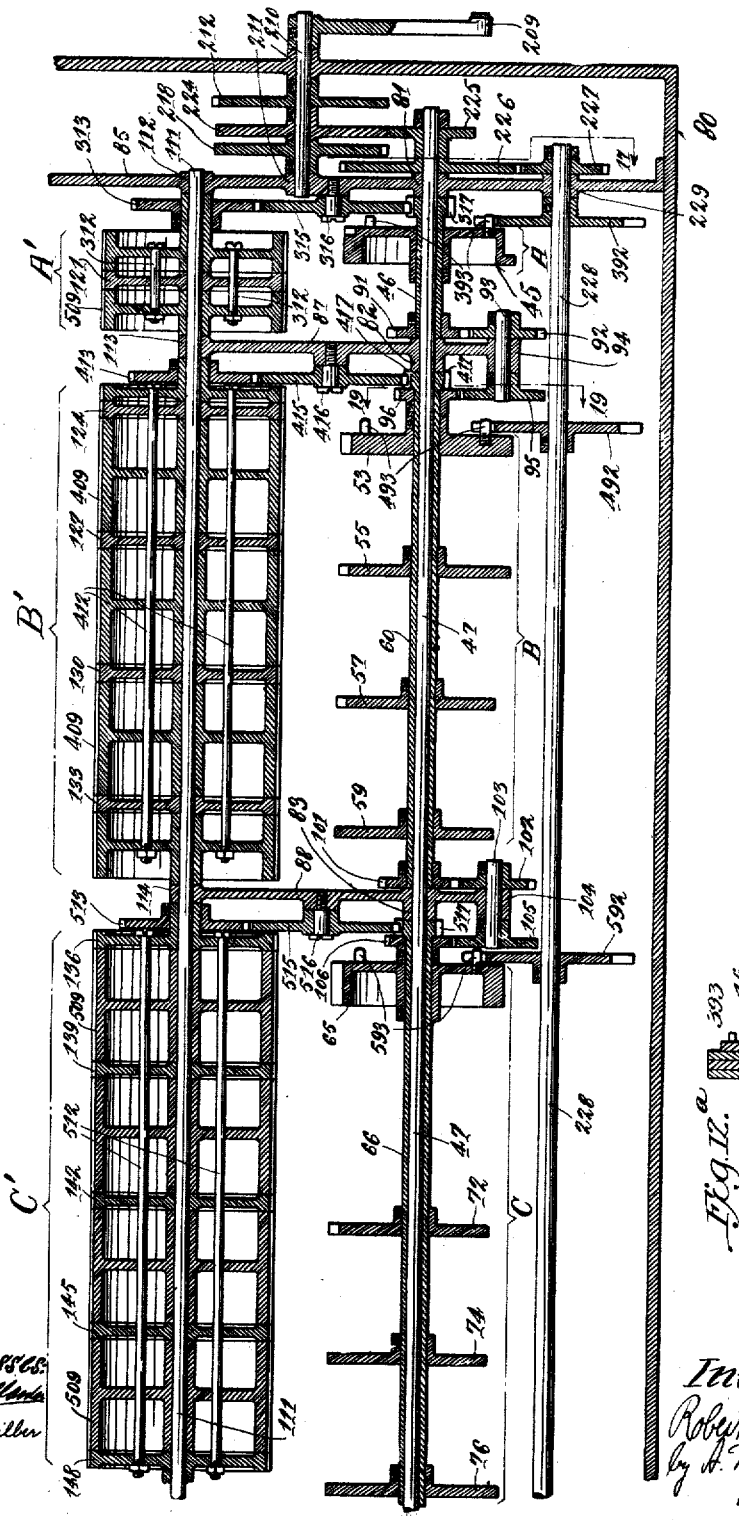
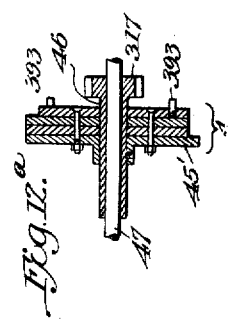

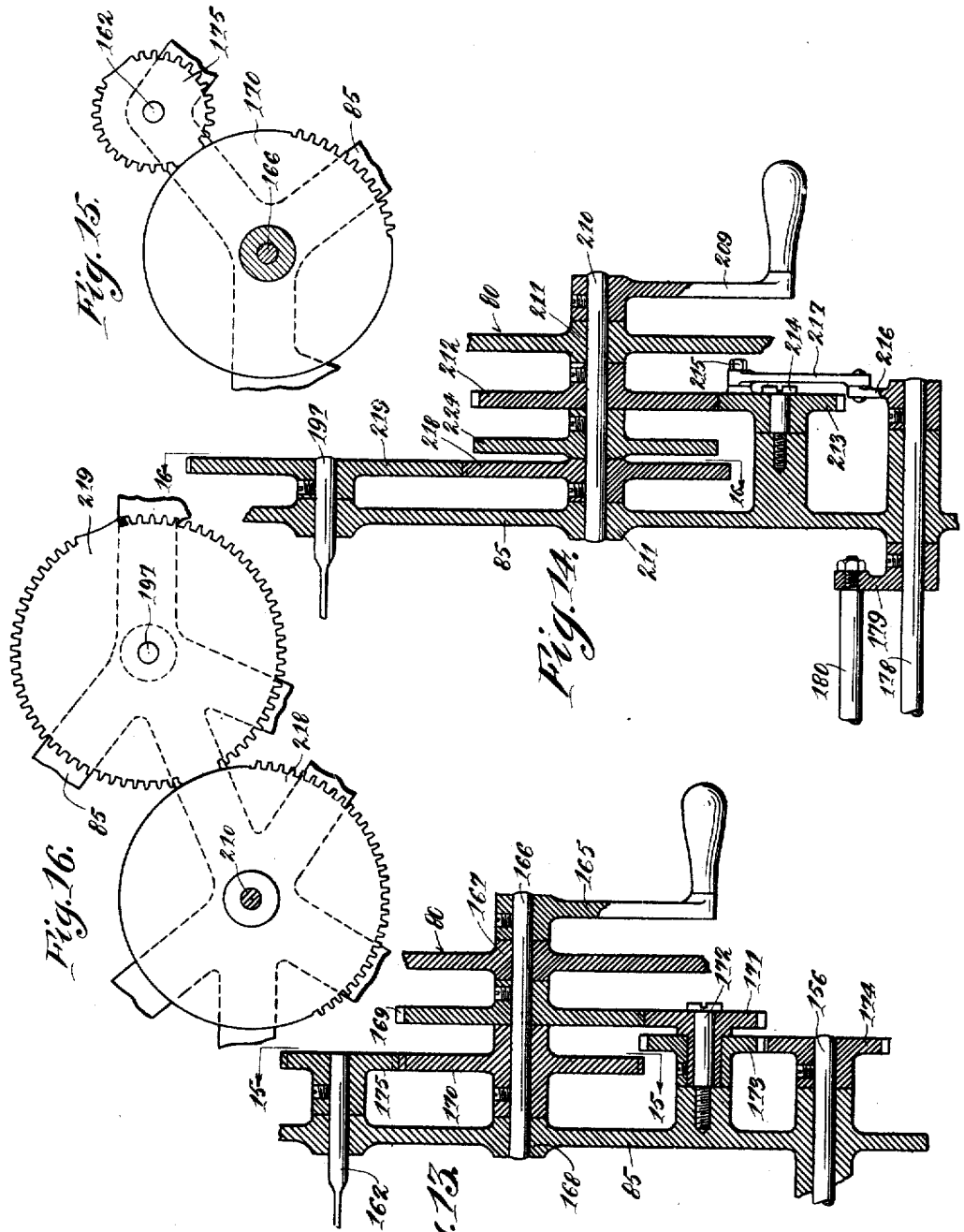

R. H. BUTER.
MECHANICAL CASHIER.
APPLICATION FILED AUG. 14, 1914.
1,202,795.
Patented Oct. 31, 1916.
14 SHEETS—SHEET 13.
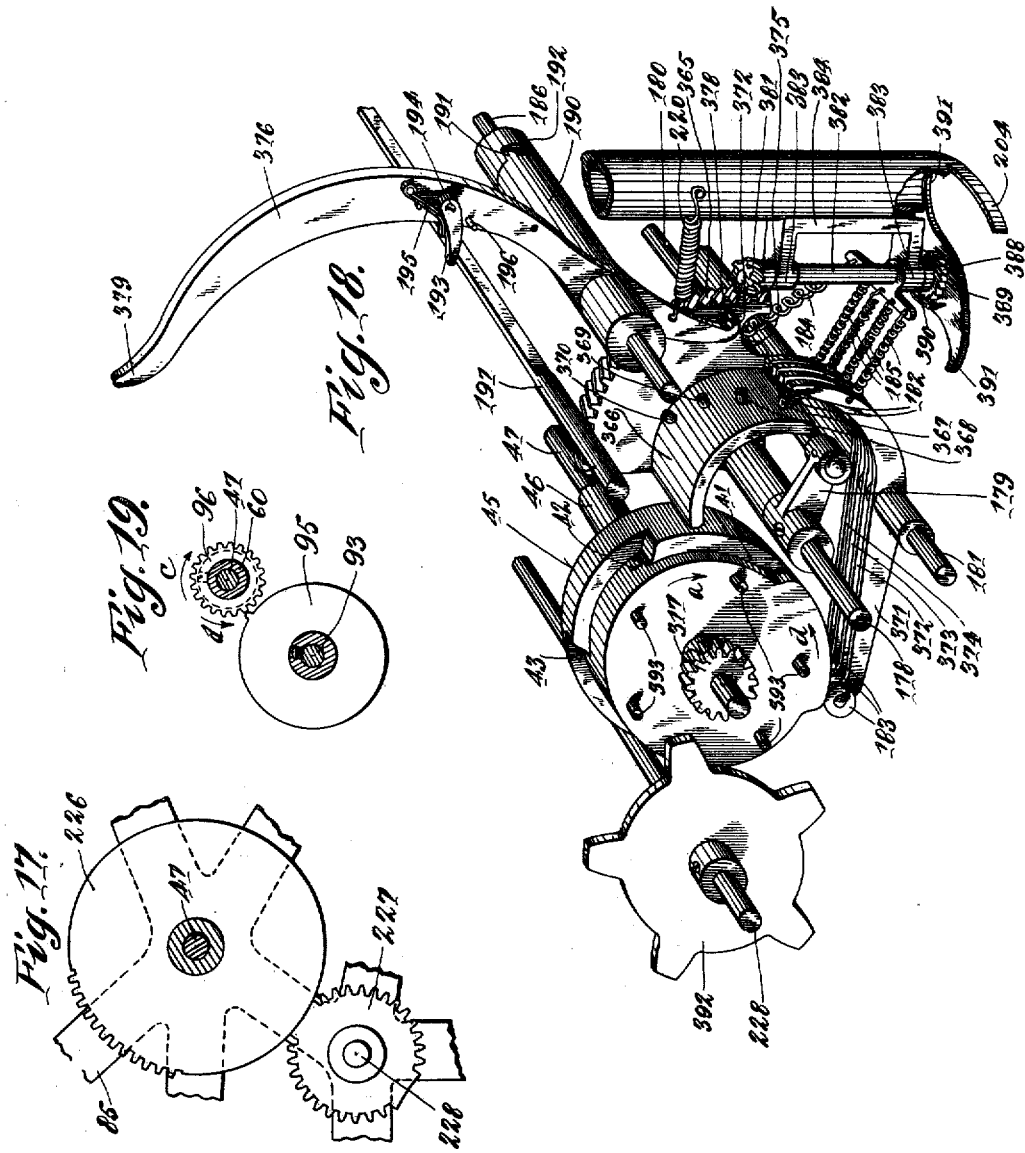

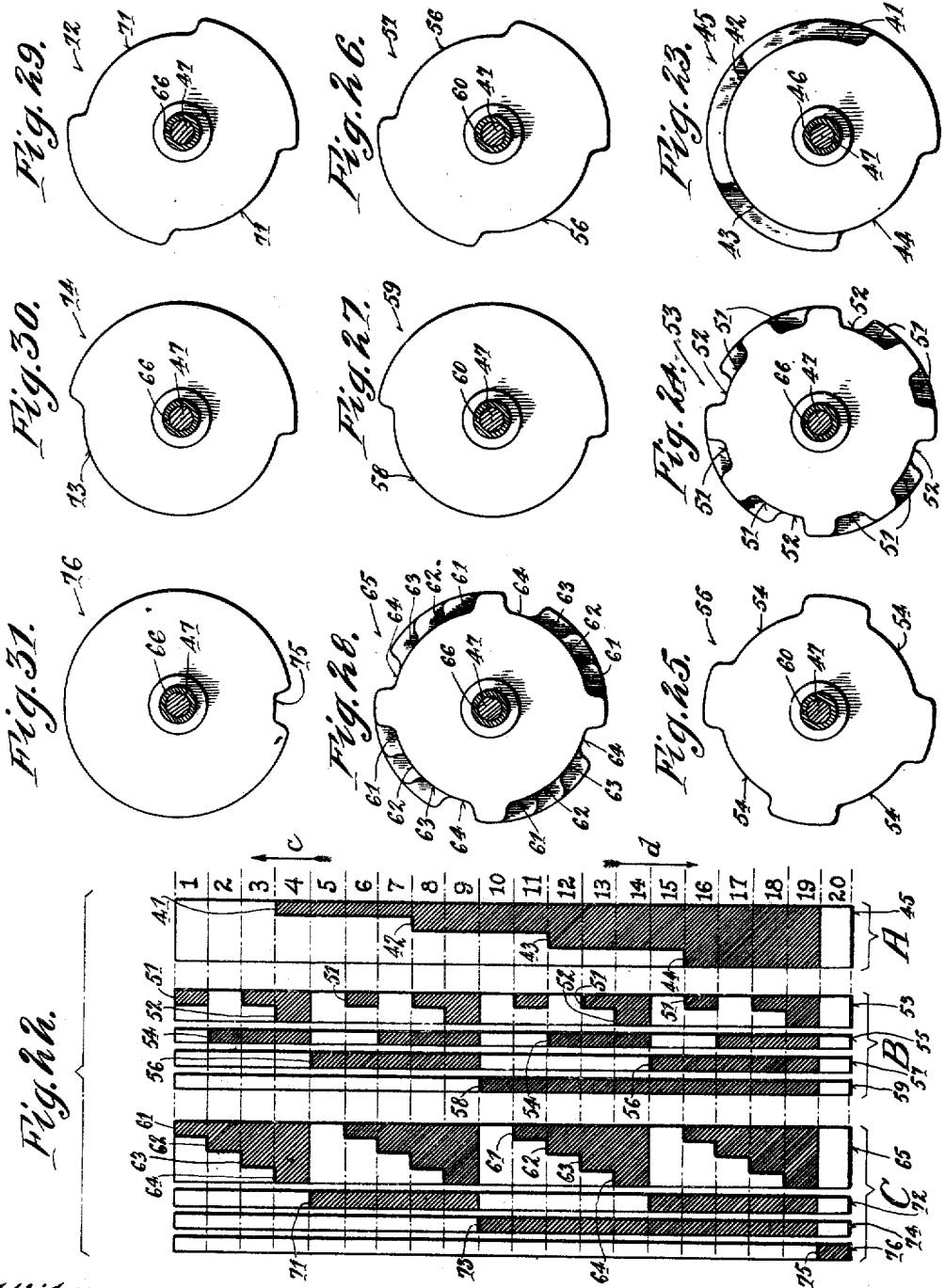

UNITED STATES PATENT OFFICE.

ROBERT H. BUTER, OF COVINGTON, KENTUCKY, ASSIGNOR OF ONE-THIRD TO JOSEPH O. SCHULTZ, OF CINCINNATI, OHIO.

MECHANICAL CASHIER.

1,202,795.  Specification of Letters Patent.  Patented Oct. 31, 1916.

Application filed August 14, 1914. Serial No. 856,786.

*To all whom it may concern:*

Be it known that I, ROBERT H. BUTER, a citizen of the United States, residing at Covington, in the county of Kenton and State of Kentucky, have invented certain new and useful Improvements in Mechanical Cashiers, of which the following is a specification.

My invention relates to mechanical cashiers adapted for delivering change representing the difference between a sum deposited and the amount of purchase, and it is the object of my invention to provide novel means whereby the amount deposited is accumulated on an accumulating cam-mechanism, to provide novel key-mechanism on which to impress the amount of purchase for having effect on the cam-mechanism opposed to the accumulating effect thereon by the amount deposited, for influencing the cam-mechanism into relation representing the difference between the accumulating effects of the amount deposited and of the purchase denoted, whereupon coin-delivering mechanism is placed in delivering relation for delivering the change or difference between the coin or sum deposited and the purchase denoted.

It is a further object of my invention to provide novel mechanism for placing the cam-mechanism in its various operative relations; further to provide novel locking means for the coin-delivering devices; further to provide novel coin-delivering mechanism; and, further, to provide novel mechanism for returning the operative devices of the machine to normal position; and the invention will be further readily understood from the following description and claims, and from the drawings, in which latter:

Figure 1 is a perspective view of my improved device showing its general structure. Fig. 2 is a front elevation of my improved device, with the front of the casing broken away for exposure of the interior of the device. Fig. 3 is a plan section of my improved device taken on the line 3—3 of Fig. 4. Fig. 4 is a vertical cross-section of my improved device taken on a line corresponding to the line 4—4 of Fig. 2, showing the interior mechanism of my improved device in end elevation. Fig. 5 is a vertical cross-section of my improved device taken on a line corresponding to the line 5—5 of Fig. 2. Fig. 6 is a vertical section of my improved device taken on a line corresponding to the line 6—6 of Fig. 2. Fig. 7 is a vertical cross-section of my improved device taken on a line corresponding to the line 7—7 of Fig. 2. Fig. 8 is a longitudinal section of my improved device taken on a line corresponding to the line 8—8 of Fig. 7, with the coin-compartments broken away. Fig. 9 is a plan view showing the purchase-levers and the pawls and ratchet-wheels operated thereby, the deposit levers and the pawls and ratchet-wheels operated thereby being removed. Fig. 10 is a plan view showing the deposit-levers and the pawls and ratchet-wheels operated thereby, partly in section on a line corresponding to the line 10—10 of Fig. 5, the purchase-levers and the pawls and ratchet-wheels operated thereby being removed. Fig. 11 is a horizontal section taken on a line corresponding to the line 11—11 of Fig. 5, showing the discharge means for the coin-compartments. Fig. 12 is an axial section of the ratchet-wheels and gearing, showing the ratchet-wheels, the cam-mechanism, the return-to-normal mechanism, and the connecting gearing laid out in plane. Fig. 12ª shows a modification. Fig. 13 is an axial section on a line corresponding to the irregular line 13—13 of Fig. 4, showing the gear-mechanism for the coin-depositing slides laid out in plane. Fig. 14 is an axial section, taken on a line corresponding to the irregular line 14—14 of Fig. 4, showing the gearing for the coin-delivering mechanism laid out in plane. Fig. 15 is a cross-section on a line corresponding to the line 15—15 of Fig. 13, showing the intermittent gearing for rotating the catch-bar for the deposit-pawls. Fig. 16 is a cross-section on a line corresponding to the line 16—16 of Fig. 14, showing the intermittent gearing for rotating the catch-bar of the safety levers. Fig. 17 is a cross-section on a line corresponding to the line 17 of Fig. 12, showing the intermittent gearing for driving the shaft operative to return the cam-mechanism to normal or zero position. Fig. 18 is a perspective view of the associated mechanism for controlling and operating the coin-discharging arms and the locking means therefor. Fig. 19 is a cross-section, taken on a line corresponding to the line 19—19 of Fig. 12, showing the gearing for transmitting motion from a group of lower to a group of a higher order. Fig. 20 is a central vertical section of a coin-slide taken on the line 2—20 of Fig. 2. Fig. 20ᵃ is a rear elevation showing one of the coin-passages with a coin therein. Fig. 21 is an axial section taken on the line 21—21 of Fig. 5, showing the driving connection for the coin-discharge arms. Fig. 22 is a diagrammatic representation of the cam-mechanism laid out in plane. Fig. 23 is a side elevation of the penny cam-disk. Fig. 24 is a side elevation of the nickel cam-disk. Fig. 25 is a side elevation of the dime cam-disk. Fig. 26 is a side elevation of the quarter cam-disk. Fig. 27 is a side elevation of the half-dollar cam-disk. Fig. 28 is a side elevation of the less than five dollar cam-disk. Fig. 29 is a side elevation of the five dollar cam-disk. Fig. 30 is a side elevation of the ten dollar cam-disk. Fig. 31 is a side elevation of the twenty dollar cam-disk; and, Fig. 32 is a perspective view, showing one of the boxes in which paper money or coins are arranged to be received.

In my improved device the adding effect of the coin-depositing mechanism may be first accumulated on the cam-mechanism in one direction and the subtracting effect of the amount of purchase then subtracted from the cam-mechanism in the opposite direction, or, if desired, the subtracting effect of the purchase mechanism may be first produced upon the cam-mechanism and the adding effect of the coin-depositing mechanism then accumulated on said cam-mechanism, the result in either case being the same, namely, the positioning of the cam-mechanism in such relation as to have the operative effect upon the coin-discharging mechanism for discharging the proper amount of change.

*The cam mechanism.*—My invention contemplates the provision of a series of cams representing, in the present exemplification, respectively penny, nickel, dime, quarter, half-dollar, dollar, five dollar, ten dollar, and twenty dollar denominations, and instanced as arranged on cam wheels; and further contemplates that the release of delivering mechanism shall take place so as to affect only the denomination of the highest order deposited and the denominations of lower order, whereby coins of higher order are locked in the machine against delivery and for preventing the extraction from the machine of a greater sum than is supplied to the same. The cam-mechanism is normally in neutral, or what I shall hereinafter term "zero" position.

I shall, for convenience, hereinafter designate the separate pieces of money, whether of paper or metal, as "coins." Selective pieces of money, for instance, silver or paper one-dollar pieces, two dollar bills and gold or paper five-dollar, ten dollar, and twenty-dollar pieces, may respectively be placed in differently sized preferably round flat boxes, shown in Fig. 32, comprising a bottom 35, a top 36, hinged together by a hinge 37, and clasped by a clasp 38, the hinge being spring-pressed by a spring 39 to normally hold the box open.

In order to properly understand the scheme of operation, I first refer to the diagrammatic representation in Fig. 22, representing the faces of the various cam-wheels laid out in plane, and in their zero relation, and to Fig. 12 in which the cam-wheels are shown connected with the coin-depositing and purchase ratchet-wheels. In the present exemplification there are groups of cam-wheels, marked A, B and C, respectively. The first group marked A represents the penny group, including a one cent cam 41, a two cent cam 42, a three cent cam 43, and a four cent cam 44, these cams being arranged side by side upon the single cam-wheel 45, it being understood that these cams, as well as others hereinafter described as on a single wheel, may be upon an integral cam-wheel, as shown, or that they may be on separate wheels, as shown in the modification 41′ in Fig. 12ᵃ. The penny cam-wheel is rigidly secured to a sleeve 46 loose about a shaft 47. Group B comprises the cams for sums from five cents to ninety-five cents, which I designate as the less-than-dollar cams. This group comprises single nickel cams 51, and two-nickel cams 52, which are located on a nickel cam-wheel 53; dime cams 54 arranged about the periphery of the dime cam-wheel 55; quarter cams 56 arranged about the periphery of the quarter cam-wheel 57; and a half-dollar cam 58 arranged about the periphery of the half-dollar cam-wheel 59. The cam-wheels of the group of cams B are respectively rigidly secured to a less-than dollar sleeve 60 loose about the shaft 47. The dollar group of cams C, in the present exemplification, includes the one dollar cams 61, the two dollar cams 62, the three dollar cams 63, and the four dollar cams 64. These are shown arranged about the periphery of a dollar cam-wheel 65 which is rigidly secured to a dollar sleeve 66, loose about the shaft 47. The group C also includes five dollar cams 71 arranged about the periphery of a five dollar cam-wheel 72, a ten dollar cam 73 arranged about the periphery of a ten dollar cam-wheel 74, and a twenty dollar cam 75 arranged about the periphery of a twenty dollar cam-wheel 76. The cam-wheels 72, 74 and 76 are rigidly secured to the dollar sleeve 66.

It will be noted by reference to Fig. 22 that, in the present exemplification, the dollar and less-than-dollar cams are arranged to move stepwise through a series of twenty spaces, numbered from 1 to 20 in said figure. The movement of the less-than-dollar cams through each of these spaces represents a five-cent or twentieth of one dollar value, their movement through the final or twentieth space transferring the dollar value into the dollar cams, as hereinafter explained. The movement of the dollar cams through each of these spaces represents a one dollar value, or one-twentieth of the highest denomination represented in the connected dollar-cams, namely the twenty-dollar denomination.

The penny cams are arranged, in the present exemplification, to move in steps of greater ratio, for the reason that the penny values are divided into five pennies, and the steps of movement of the penny cams, that is, the effective spaces of the penny cams, are therefore five, each step or effective space encompassing four of the twenty spaces of the less-than-dollar cams, the movement of the penny cams through the fifth step or penny space transferring the five-cent value into the nickel cam, as hereinafter explained.

The sum of the spaces in each lower group is the equivalent of a single space in the next higher group.

It will be hereafter noted that the coin-depositing and the purchase mechanism respectively have adding and subtracting effects upon the cam-wheels based on these divisions of spaces, the spaces corresponding to the denomination of least value in each of the groups of cams.

The cams on the respective cam-wheels are so arranged that when the adding and subtracting effects of the coin-depositing and amount-of-purchase mechanisms are transferred into the cam-mechanism, the cam-mechanism is arranged with those cams in line in one of the twenty spaces, represented as the space 20, which have the effect of releasing a sum which is the equivalent of the difference between the adding effect of the coin-depositing mechanism and the subtracting effect of the amount-of-purchase mechanism, for permitting this coin difference to be discharged from the coin-discharging mechanism.

I provide one series of cams 54 for dimes, so that a single dime may be discharged in giving change, but if the amount of change to be delivered represents two multiples of a dime, I prefer to discharge one dime and two nickels, for which reason I provide the two-nickel cams 52.

80 represents the main frame of my improved device, shown as a casing, in which the operated devices are contained.

The cam-shaft 47 is mounted in bearings 81, 82, 83 and 84. The bearing 81 is in a supporting plate 85 rigidly secured to the casing of the machine. The bearings 82, 83, are respectively in plates 87, 88, and the bearing 84 is in the end-plate 89 of the casing.

The following means are provided for accumulating the operative effect of sleeves of lower order into sleeves of higher order. A gear 91 is secured to the sleeve 46 and meshes with a gear 92 fast on a shaft 93 journaled in a bearing 94 on the plate 87. The shaft 93 has a single-tooth gear 95 fast thereon, the tooth of which is adapted to mesh with a gear 96 fast on the sleeve 60. These teeth are shown in normal or zero position in Fig. 19. When now the penny cam-wheel 31 has been rotated in coin-depositing, throughout its cycle of five effective peripheral spaces, which is accomplished in five divisions of movement, the tooth on the single tooth gear 95 will have engaged one of the teeth of the gear 96 and rotated the same to the extent of one peripheral space of the group B of cam-wheels, this engagement of this single tooth with the gear 96 taking place during the final division of movement of the penny cam-wheel 45.

A gear 101 is fast on the sleeve 60 and meshes with a gear 102 fast on a shaft 103 journaled in a bearing 104 on the plate 88. A single tooth gear 105 is fast on the shaft 103, the tooth of which is arranged to mesh with the teeth of a gear 106 fast on the sleeve 66, for rotating the same to the extent of one of the twenty spaces of the group C of cam-wheels, the parts being similar to the parts shown in Fig. 19. The accumulation from the group B of cam-wheels to the group C of cam-wheels is effected in coin-depositing at each completion of the revolution of the group B of cam-wheels.

When denoting purchases, the subtracting effect of a group of cams of lower order upon a group of higher order takes place at the beginning of movement of the group of lower order.

*The coin-deposit and amount of purchase mechanism.*—111 is a shaft supported in a bearing 112 of the supporting plate 85, in bearings 113, 114, respectively in the plates 87, 88, and a bearing 115 in the end plate 89. The plates 87, 88, are positioned in the machine by their bearings about the respective shafts 111 and 47. (See Figs. 2, 4, 5, 9, 10 and 12).

The shaft 111 supports three groups of wheels, shown as ratchet-wheels. These groups comprise ratchet-wheels respectively of the coin-depositing mechanism and of the amount-of-purchase mechanism. These groups, marked respectively as A′, B′, and C′, coact respectively with the groups of cams A, B and C. These groups of wheels comprise a wheel in the coin-depositing mechanism for each denomination of coin intended for use in connection with the present exemplification of my invention. Suitable pawls coact for turning the wheels about their axes of rotation, the operative engagement of these pawls with the ratchet-wheels being controlled by suitable controlling mechanism for causing rotation of the respective groups of wheels throughout angles of movements determined by the value of coin deposited. Thus 121 is a coin-deposit ratchet-wheel of penny denomination, with which a pawl 122 coacts, controlled by a shield 123. This ratchet-wheel 121 is in the group A' of wheels. (See particularly Fig. 10).

124 is a nickel coin-deposit ratchet-wheel, with which a nickel-pawl 125 coacts, controlled by a shield 126. 127 is a dime coin-deposit ratchet-wheel, with which a dime-pawl 128 coacts, controlled by a shield 129. 130 is a quarter coin-deposit ratchet-wheel, with which a quarter-pawl 131 coacts, controlled by a shield 132. 133 is a half-dollar coin-deposit ratchet-wheel, with which a half-dollar-pawl 134 coacts, controlled by a shield 135. The ratchet-wheels 124, 127, 130 and 133 are secured together.

The group C' of ratchet-wheels comprises a dollar coin-deposit ratchet-wheel 136, with which a pawl 137 coacts, controlled by a shield 138; a two dollar coin-deposit ratchet-wheel 139, with which a two dollar pawl 140 coacts, controlled by a shield 141; a five dollar coin-deposit ratchet-wheel 142, with which a five dollar pawl 143 coacts, controlled by a shield 144; a ten dollar coin-deposit ratchet-wheel 145, with which a ten dollar pawl 146 coacts, controlled by a shield 147; and a twenty dollar coin-deposit ratchet-wheel 148, with which a twenty dollar pawl 149 coacts, controlled by a shield 150. The ratchet-wheels 136, 139, 142, 145 and 148 are rigidly secured together and rotate simultaneously about the shaft 111. The shields are on a shield-plate 151 suitably rigidly secured in place, as by screws 152.

Besides the coin-depositing ratchet-wheels just described, the respective groups of wheels A', B', and C' also comprise ratchet-wheels of the purchase mechanism, so that the amount of purchase may be subtracted from the amount of coin deposited, there being a pawl coacting with these purchase ratchet-wheels for each amount represented on the keys of the purchase mechanism (see especially Fig. 9). The ratchet-wheels of the respective groups of wheels A', B' and C' are made integral with each other lengthwise of the shaft 111, where permitted by the mechanism, so as to provide simplicity and rigidity.

It may be here stated that I have so geared the ratchet-wheels with the cam-wheels as to cause a complete revolution of the cam-wheels by a partial revolution of the ratchet-wheels, for the reason that the pawls, mounted as they are in the present exemplification, make effective contact with the ratchet-wheels throughout only a portion of the circle of movement of the ratchet-teeth thereof. The gear-ratio I prefer is one to five, that is to say, the ratchet-wheels make one-fifth of a revolution for effecting a complete revolution of the cam-wheels. The teeth of the ratchet-wheels are also of a proper number to effect the proper placing of the cams with relation to the spaces shown in the diagram of Fig. 22, as hereinbefore explained. Thus the penny group of cam-wheels, having five rest positions, the penny group of ratchet-wheels is provided with twenty-five ratchet-teeth, and the less-than-dollar group and the dollar group of cam-wheels, each having twenty rest positions, the ratchet-wheels of these groups are provided with one hundred ratchet-teeth.

The ratchet-teeth of the coin-deposit ratchet-wheels and the ratchet-teeth of the purchase ratchet-wheels preferably extend in opposite directions, as the pawls coacting therewith respectively move in opposite directions for effecting the positions of movement of the ratchet-wheels.

*The purchase-key connections.*—The purchase-keys comprise groups $A^2$, $B^2$ and $C^2$ of keys, which coöperate respectively with the ratchet-wheel groups A', B' and C' and with the cam-groups A, B and C. (See Figs. 1, 2, 5, 9 and 12.)

$A^2$ represents the penny group of purchase-keys, each key being designated 301, mounted on a bell-crank lever 302, rocking on a bearing 303 about a shaft 156 supported in bearings 157, 158, respectively in the supporting plate 85 and end-plate 89. The key-ends of these bell-crank levers extend through slots 304 in the front wall 159 of the casing. Purchase-pawls 306 are articulated to the bell-crank levers by articulations 307, springs 308 urging said pawls toward the ratchet-wheels 309 of the group A' of ratchet-wheels, with which said purchase-pawls 306 coact. Shields 310 on the shield-plate 151 determine the extent of coaction between said penny purchase-pawls and purchase ratchet-wheels for determining the extent of movement imparted by the respective pawls to the ratchet-wheels, this extent of movement being dependent on the coin value of the key depressed. The bell-crank levers are normally raised by springs 311 for positioning the key-ends of said bell-crank levers in the upper ends of the slots 304 which thereby act as stops.

The coin-deposit ratchet-wheel 121, and the purchase ratchet-wheels 309, are rigidly secured together by means of clamp-bolts 312 for rotating together, a gear 313 being rigidly secured to the hub 314 of one of said ratchet-wheels and meshing with a gear 315 journaled about a shoulder-bolt 316, in the supporting plate 85, the gear 315 meshing with a gear 317 fast on the cam-sleeve 46. This gearing transmits the adding and subtracting effect of the group A' of ratchet-wheels into the group A of cam-wheels.

Referring to Fig. 5 it will be noted that the actuating movement of the deposit pawl 122 is in the direction of the arrow $a$ and the actuating movement of the purchase pawls is in the direction of the arrow $b$, and that the deposit-pawl actuates the penny cam-wheels in the direction of the arrow $c$, and the purchase pawls actuate the penny cam-wheels in the direction of the arrow $d$, the deposit-pawls and the purchase-pawls, as well as the cam-wheels of the other groups moving in similar directions.

$B^2$ is the group of less-than-dollar purchase-keys, which operate on pawls coacting with the purchase ratchet-wheels of the group B'. (See Figs. 1, 2, 6, 9 and 12.) Each of the keys of this group $B^2$ is designated 401 mounted on a bell-crank lever 402 rocking on a bearing 403 about the shaft 156. These bell-crank levers extend through slots 404 in the front wall of the casing. Purchase-pawls 406 are articulated with the bell-crank levers by articulations 407, springs 408 urging said pawls toward the ratchet-wheels 409 of the group B' of ratchet-wheels with which said pawls 406 coact. Shields 410 on the shield-plate 151 determine the extent of coaction between said pawls and ratchet-wheels for determining the extent of movements imparted by the respective pawls to the ratchet-wheels, this extent of movement being determined by the coin value of the key depressed. The key-ends of the bell-crank levers are normally raised by springs 411 for positioning said bell-crank levers in the upper ends of the slots 404, which thereby act as stops.

The coin-deposit ratchet-wheels 124, 127, 130 and 133, and the purchase ratchet-wheels 409, are rigidly secured together by means of clamp-bolts 412 for rotating together, a gear 413 being rigidly secured to the hub 414 of one of said ratchet-wheels and meshing with a gear 415 journaled about a shoulder-bolt 416 in the plate 87, the gear 415 meshing with a gear 417 fast on the cam-sleeve 60. This gearing transmits the adding and subtracting effects of the group B' of ratchet-wheels into the group B' of cam-wheels.

$C^2$ represents the dollar group of purchase-keys, which operate on pawls coacting with the purchase ratchet-wheels of the group B'. (See Figs. 1, 2, 7, 9 and 12). Each key of this group is designated 501 mounted on a bell-crank lever 502 rocking on a bearing 503 about the shaft 156. These bell-crank levers extend through slots 504 in the front wall of the casing. Purchase-pawls 506 are articulated to the bell-crank levers by articulations 507, springs 508 urging said pawls toward the ratchet-wheels 509 of the group C' of ratchet-wheels with which said pawls 506 coact. Shields 510 on the shield-plate 151 determine the extent of coaction between said pawls and ratchet-wheels for determining the angular movement imparted by the respective pawls to the ratchet-wheels, dependent on the coin value of the key depressed. The key-ends of the bell-crank levers are normally raised by springs 511 for positioning the key-ends of the bell-crank levers in the upper ends of the slots 504 which thereby act as stops.

The coin-deposit ratchet-wheels 136, 139, 142, 145 and 148, and the purchase ratchet-wheel 509 are rigidly secured together by means of clamp-bolts 512 for rotating together, a gear 513 being rigidly secured to the hub 514 of one of said ratchet-wheels and meshing with a gear 515 journaled about a shoulder-bolt 516 in the plate 88, the gear 515 meshing with the gear 517 fast on the cam-sleeve 66. This gearing transmits the adding and subtracting effects of the group C' of ratchet-wheels into the group C of cam-wheels.

*Actuating means of the coin-deposit mechanism.*—I shall describe this mechanism with particular reference to the penny operating mechanism shown in Fig. 5, the nickel operating mechanism shown in Fig. 6 being similarly constructed and the parts designated by similar reference numerals raised into the four hundred series, the parts of the dollar mechanism being also similarly constructed and designated by similar reference numerals raised into the five hundred series of numerals.

Referring now to Figs. 1 to 8 inclusive, the casing is provided with a series of coin-openings 320, 420 and 520, which communicate with coin-chutes 321, 421 and 521 communicating with coin passages 322, 422, 522.

Referring now particularly to the penny mechanism, (see also Figs. 20 and 20ª), there is a main slide 323 which slides longitudinally in the passage 322. This slide has on it a gate 324 at each side of the slide, these gates being pivoted to the respective side walls of the slide 323 by pivots 325, the springs 326 acting to raise the gates. The pair of gates are arranged to be contacted by the side edges of the coins. An auxiliary slide 328 is arranged to reciprocate in a guideway 329 in the main slide 323 and is of such width as to normally pass through the space 330 between the gates 324, the auxiliary slide passing idly through said space when no coin is deposited in rear of said gates. Some of the auxiliary slides are shown as round and others as polygonal in cross-section, depending on the size of coin to be moved. When, however, a coin is received from the chute 321 into the coin-space 331 between the end of the auxiliary slide and the gates 324, the end of the auxiliary slide will contact the coin and impel it against the gates and thereby actuate the main slide 323.

The gates are normally held in down position by means of rollers 332 coacting with rails 333, the springs 326 exerting a raising force upon the gates. The rear ends of these rails are curled upwardly, as shown at 334, for permitting the gates to swing on their pivots through the medium of the springs 326 for raising the gates away from the coin, the coin thereupon dropping into an incline 336 which communicates with a coin-receptacle 337, shown as a coin tube.

The coin-deposit pawl 122 (see also Fig. 10), of the penny group of mechanism is connected with the main slide by means of a pivot 338 in a lug 339 depending from the main slide, the pawl being normally urged toward the ratchet-wheel by a spring 340. The coin-deposit pawls of the less-than-dollar and the dollar groups of mechanism are connected with the slides of said groups of mechanism by similar parts, designated by similar reference numerals raised respectively into the series four hundred and five hundred.

The auxiliary slides 328, 428 and 528 are actuated by arms 343, 443, 543, connected therewith by means of slot and pin connections, one of which is shown in Fig. 20 at 344, the arms being journaled about the shaft 156. There is a series of actuating dogs rigidly secured to this coin-deposit operating shaft 156, respectively engaging keepers 347, 447, and 547, respectively pivoted on the arms 343, 443 and 543 by means of pivots 348, 448, and 548, the keepers being provided with heels 349, 449, and 549.

Springs 350, 450 and 550, connecting with the heels and with a suitable point on the main frame, normally urge the keepers into engagement with the dogs, and normally retract the arms 343, 443 and 543, and the main slides and auxiliary slides operated thereby, pins 351, 451 and 551 acting as positioning stops for the keepers.

There is a dog and a keeper for each denomination of coin deposited, the dogs being arranged about the coin-deposit operating shaft so as to operate the arms consecutively and consequently to operate the coin-slides of successive denominations one after the other, so that the coins being deposited may have successive effect upon the ratchet-mechanisms of the several groups, in order that each coin value may be carried into the cam-wheels of the respective groups, and successive effect be had upon the groups of mechanism, so that coin-values may be carried from a group of lower to a group of higher order.

The dog 353 coacts with the keeper 347 of the penny group of mechanism. The dogs 453, 454, 455 and 456 of the less-than-dollar mechanism coöperate with the keepers 447 on the arms of the coin-slides of the five cent, ten cent, quarter and half-dollar coins respectively. The dogs 553, 554, 555, 556 and 557 coöperate respectively with the keepers on the arms of the coin slides in the dollar group of mechanism for the one dollar, two dollar, five dollar, ten dollar and twenty dollar coin-values.

A tripper rod 160 is provided, against which the toes 358, 458 and 558 of the keepers are adapted to engage for tripping the keepers away from the dogs and permitting the arms and slides to return to normal positions.

The angular distance between adjacent dogs is such as to effect separate complete movement of each coin-deposit pawl throughout its path of registering movement and whatever carry there may be from a group of cams of lower into a group of cams of higher order.

If more than one coin of a given denomination is deposited, the coin-deposit operating shaft must be given as many revolutions as equal the largest number of coins of a given denomination deposited in order to effect deposit of all the coins.

The turning of the coin-deposit operating shaft one revolution, in the direction of the arrow $e$, moves all of the arms and auxiliary coin-slides forward, such of the main slides as have coins deposited therein also moving forward by reason of the contact of the auxiliary slide with the coin. The main slides are provided with latches 359, 459 and 559, which are pivoted on the depending lugs of said main slides, as shown at 360, 460 and 560, the latches being spring-pressed by means of springs 361, 461, 561, against stops 362, 462, 562, shown as pins in the depending lugs. 162 is a catch-bar upon which the latches catch for maintaining such of the main slides, as have been advanced on account of having coins therein, temporarily in position, so as to insure release of the coin at the end of its advancing movement into the incline for its deposit into the coin receptacle.

I provide a system of gearing for the operation of the coin-deposit operating shaft and the catch-bar, which is a rotatable bar, so that the advancing movement of the arms takes place during the first half of the rotation of the coin-deposit operating crank, whereupon there is an idle period of one-eighth of a revolution of the operating crank, during which the main slides, which have been advanced, are held by the catch-bar, whereupon the catch-bar is rotated a half revolution for releasing the latches, which is effected during a quarter revolution of the coin-deposit operating crank, all the parts of the coin-deposit mechanism having meanwhile returned to neutral positions, there being then one-eighth of a revolution of the coin-deposit operating crank to bring it to normal position. The gearing for effecting these movements is as follows: 165 is a coin-deposit crank handle rigid on a coin-deposit crank handle shaft 166 which is journaled in bearings 167, 168, of rigid parts of the main frame. This shaft has intermittent gears 169, 170, rigid thereon. The teeth of the gear 169 mesh with the teeth of an intermittent gear 171 on a shoulder-stud 172 fast on the supporting plate 85. Fast on the intermittent gear 171 there is a continuous gear 173 which meshes with a continuous gear 174 fast on the coin-deposit operating shaft.

The teeth of the intermittent gear 170 mesh with the teeth of an intermittent gear 175 fast on the catch-bar 162 for imparting a one-half revolution to the catch-bar at each revolution of the intermittent gear 170.

The idle parts on the gears 169, 171, and 170 and 175, control the intervals between actuations and times of revolutions respectively of the coin-deposit operating shaft and of the catch-bar.

*The coin-discharging mechanism.*—For each denomination of coin intended to be discharged, there is a discharge segment-gear. No provision is made in the present exemplification for the discharge of two dollar bills, two single dollars being discharged in preference. I shall describe this coin-discharging mechanism with especial reference to the penny group of elements, the elements of the less-than-dollar group and of the dollar group being similar to those of the penny group, and designated by similar reference numerals raised respectively into the four hundred and five hundred series of reference numerals.

Referring now particularly to Figs. 5, 8, 10 and 18, 365 denotes the discharging segment gear. The segment-gears are loose about a shaft 178, upon which they are rockable. The shaft 178 is a rockable shaft journaled in bearings of the main frame, and has arms 179 rigid thereon to which a replacement bar 180 is connected, the replacement bar being arranged to operate the discharging segment-gears in their coin-discharging movement and to replace said segment-gears into normal positions at the end of said discharging movement.

The segment-gear 365 is provided with a flange 366 on which pins 367, 368, 369 and 370 are located, the pins coacting with controlling levers 371, 372, 373, 374, separately pivoted on a rod 181 extending lengthwise of the machine and mounted in bearings of the main frame. The controlling levers are provided with contact-lugs 182 arranged to contact the pins respectively, and with rollers 183 arranged to coact with the sunken cam-faces 41, 42, 43 and 44, being respectively the one cent, two cent, three cent and four cent cams of the penny group of mechanism.

A spring 184 normally urges the segment-gear into an initial position which determines its angular distance of operative movement when discharging coin, it being understood that the replacement bar 180 will first have been moved away from the segment-gear. The initial position of the segment-gear in the discharging movement will be determined by the position of the cams 41, 42, 43, 44, for placing either one or more or all of the contact-lugs 182 into unobstructing position, the part 375 on the segment-gear acting as a stop against the hub of the controlling lever 374 when all of said lugs have been moved out of obstructing position. The controlling levers are normally retracted by springs 185.

The segment-gear is normally locked in retracted position by means of a locking lever 376, there being one of these locking levers for each of the segment-gears. The locking levers are pivoted about a rod 186 mounted in bearings of the main frame. A hook 377 on each of the locking levers is arranged to be received about a pin 378 on the segment-gear arranged to hold the segment gear in retracted position.

The locking lever has a contact-end 379 arranged to be contacted by a pin 380 of the main coin-slide, so that when the main coin-slide is advanced, owing to the presence of a coin therein, the locking lever corresponding thereto will be actuated for releasing the segment-gear of that particular denomination. Means are provided further for releasing not only the segment-gear of a particular denomination in the manner stated, but also for releasing all segment-gears of less denominations or lower orders so as to open the whole machine below the coin of highest order received by the machine for making change, the segment-gears of higher orders however remaining locked.

Referring to Figs. 8 and 18, the locking levers are provided with hubs 190. The proximate ends of these hubs are respectively provided with a lug 191 and a recess 192, the recess being wider than the lug, with the lug located at one end of the recess, in such manner that the lugs of the levers of higher order will engage one wall of the recesses of all levers of lower order for turning all levers of lower order upon actuation of a given lever, but permitting the lug on the actuated lever to move in the recess of next higher order without actuation thereof.

When a locking lever has been actuated, it is held in released position by means of a keeper 193 pivoted to the arm of the lever at 194 and normally spring-pressed by a spring 195 against a stop 196 on said arm into engagement with one of the flat faces of a coin-discharge catch-bar 197

The segment-gear 365 is arranged to mesh with a pinion 381 fast on a shaft 382 (see also Fig. 21), journaled in bearings 383 of a bracket 384 and stepped in a bearing 385 in a shaft 386 journaled in a bearing 387 in the casing. The shaft 382 has a ratchet-wheel 388 fast thereon. The shaft 386 has a plate 389 fast thereon on which a ratchet 390 is pivoted, the ratchet being normally spring-pressed toward the teeth of the ratchet-wheel and arranged in such manner that when the segment-gear is depressed by its spring, that the teeth of the ratchet-wheel will have idle movement past the ratchet.

The plate 389 is provided with coin-discharge fingers 391, each of the plates being shown provided with two of these fingers. These fingers are arranged to be moved past the bottom of the coin-receptacle for discharging a single coin from the coin-receptacle at the movement of each finger past its lower end.

The coins are normally stacked in the coin-receptacles and normally rest on shelves 201, 202, arranged alternately at different elevations to permit the fingers on adjacent coin-discharging plates to pass each other, the coins being discharged through slots 203 between said shelves and the lower ends of the coin-receptacles, the coins in their discharge being guided by curved lips 204 extending from the respective coin-receptacles. The coins are discharged upon a sloping shelf 205 and are received through a front slot 206 in the front of the casing into a gutter 207.

The penny segment-gear has capacity for the discharge of four pennies representing two complete revolutions of the shaft 386, the discharge of each penny representing a half revolution of said shaft, namely the movement of one finger past the penny coin-receptacle.

The flange of the nickel segment-gear is provided with two pins, as under the scheme employed, there are times when it is desired to discharge two nickels at the giving of one set of change, and with the third longer pin 469, which is arranged to act as a stop to prevent a depression of the segment-gear by its spring to a greater extent than to permit a complete revolution of the finger plate of the nickel receptacle upon the discharge movement thereof.

The dime, quarter, fifty-cent, five dollar, ten dollar and twenty dollar segment-gears have their flanges each provided with but one pin, as it is desired to discharge only one of these coins at the giving of any single change, and with stop-pins corresponding to the positions of the pins 468 and 568 respectively, for preventing the descent of the segment-gear to a greater extent than to permit a half revolution of the finger-plates cooperating therewith.

The dollar segment-gear is provided with four pins, similar to the penny segment-gear, as it is the purpose to discharge either one, two, three or four single dollars. It is also provided with a stop 575 similar to the stop 375.

The actuation of the segment-gears in their coin discharging movements is effected as follows: There is an operating crank 209 fast on an operating crank-shaft 210 journaled in bearings 211 of the main frame. On this operating crank-shaft there is an intermittent gear 212 which meshes with an intermittent gear 213 on a shoulder-stud 214 threaded to the supporting plate 85. The teeth of the intermittent gear 212 extend throughout one-half its circumference. There is a crank-pin 215 on the intermittent gear 213 which connects with an arm 216 on the rocker-shaft 178 for returning the segment-gears to normal position by operation of the replacement bar 180.

217 is a link which is articulated respectively to the crank-pin and to the arm. During the first part of the rotation of the intermittent gear 213, the replacement bar descends for permitting the descent of the segment-gears which have been released by the actions of the coins, to the limit of movement determined by the cam-mechanism, and upon the latter portion of the rotation of said intermittent gear 213, the said replacement bar is again raised for returning the segment-gears to normal positions, and, during such return, actuating the discharging fingers through the medium of the pinions in mesh with said segment-gears, as hereinbefore described.

The shaft 210 has a further intermittent gear 218 thereon, the teeth of which extend through approximately one-half its circumference and are arranged to mesh with the teeth of an intermittent gear 219 fast on the coin-discharge catch-bar 197 for rotating said catch-bar one-half revolution at each revolution of the crank-shaft, this revolution taking place during the latter half of the revolution of the crank-shaft for releasing the keepers of the respective coin-discharging locking levers, for permitting retraction of said locking levers by means of springs 220, whereby the hooks of the locking levers are received under the locking pins on the segment-gears for holding the latter in locked relation.

*Return to zero position.*—Means are further provided for returning the cam-wheels to zero position, this being preferably effected during the rotation of the coin-discharge catch-bar, and slightly spaced from the end of the movement of the segment-gears, preferably by one-eighth of a revolution of the crank-shaft. For this purpose the crank-shaft is provided with a further intermittent gear 224 which meshes with an intermittent gear 225 rotating loosely about the cam-wheel shaft, there being a continuous gear 226 fast with the intermittent gear 225, the continuous gear 226 meshing with a continuous gear 227 fast on a shaft 228 journaled in bearings 229 in the main frame. The shaft 228 has star-wheels 392, 492, 592, fast thereon which are arranged to coact with pins 393, 493, 593, respectively on the cam-wheels of the respective groups of cam-wheels. These respective series of pins are arranged to be engaged by the teeth of the star-wheels, but have an intermission or space, one of which is shown at 394, therebetween, at zero position, through which the star-wheels rotate without effect upon the cam-wheels. The teeth of the star-wheels act on the pins of any cam-wheels which have been positioned out of zero position, by either the coin-deposit or the purchase mechanism, in order to return the same to zero position. This last-named operation takes place after the first half revolution of the crank-shaft, after which there is an idle one-eighth revolution of the crank-shaft to bring the crank-shaft into initial position.

*Filling and emptying mechanism.*—Means are provided for supplying the machine with coins without actuation of any of the cashier mechanism so as to supply the machine with coins preparatory to practical operation of the machine.

Each of the coin-receptacles is provided with a branch chute 231 preferably extending toward the rear end of the casing. The rear wall of the casing is provided with a slot 232 for each of said branch chutes. 233 is a bar which is longitudinally slidable in a guide-way 234 and is controlled by means of a lock 235, the bar being a continuation of the bolt of the lock and moved longitudinally by the key of the lock. This bar is provided with slots 236 which are arranged to be placed into registry with the slots 232 or to be placed out of registry therewith by means of the lock mechanism, and when out of registry, the body of the bar is received between the slots 232 and the branch chutes for preventing the insertion of coin therethrough.

In order to empty the machine, means are provided for manually operating the discharging fingers at the bottoms of the coin-receptacles. This is shown effected by providing the lower ends of the shafts to which said discharging fingers are secured with spiral gears 241 which are arranged to be meshed by spiral gears 242 secured to shafts 243 journaled in bearings 244 of the casing. The rear ends of these shafts are journaled in a bar 245 which is arranged to be shifted longitudinally for connecting or disconnecting the spiral gears 242 with the spiral gears 241, the shafts 243 being sufficiently loose in their bearings 244 to permit the swinging of the respective ends of said shafts.

The front ends of the shafts 243 are provided with key-receiving means 246. The front of the casing is provided with holes 247 in line with said shafts. 248 is a closing bar arranged to slide longitudinally in a guideway 249 and is provided with holes 250 arranged to be placed in registry or out of registry with the holes 247.

The closing bar 248 is arranged to be locked in closing position and to be moved lengthwise by means of a lock 251, the closing-bar 248 being in effect a continuation of the bolt of the lock and moved lengthwise by the key of the lock. This bar is connected with the bar 245 by means of a lever 252, pivoted at 253 to the casing, and articulated with both said bars, at 254 and 255, so that when the closing bar 248 is placed in position for registry of its holes with the holes 247, the bar 245 is moved lengthwise for causing meshing with the spiral gears 242 with the spiral gears 241. When the closing bar is locked in closing position, the bar 245 is moved in the opposite direction for causing disengagement of said gears.

*The operation.*—Illustrating the operation of my improved device and having reference to the cam-mechanism illustrated in Fig. 22, it will be assumed that a deposit of fifteen dollars represented by a five dollar coin and a ten dollar coin and a purchase of $11.91 is made. In Fig. 22 the shaded portions represent the sunken or cam-portions of the cam-wheels and the unshaded portions the raised portions of the cam-wheels. These cam-wheels are, in Fig. 22, shown in zero position, there being raised portions on all of the cam-wheels in line with each other in the space 20, representing the zero line, except on the twenty dollar cam-wheel, the cam of which is normally in zero position for the reason that when a twenty dollar coin is deposited there is a complete revolution of this cam-wheel for its return to zero position, the coin-delivering segment-gear therefor, however, being in normally locked relation for preventing discharge of a twenty dollar coin, except when required in the change-making scheme. The placing of the five dollar and ten dollar coins in their receiving coin-chutes 521 prepares the five dollar and ten dollar pawls 143, 146, for actuation in the coin-deposit movement of the cams. The amount of purchase being $11.91, the purchase-key having on it the designation "11" in the dollar group $C^2$ of purchase-keys, the purchase-key having on it the designation "90" in the less-than-dollar group $B^2$ of purchase-keys, and the purchase-key having on it the designation "1"

in the penny group A² of purchase-keys, will be depressed. Depression of the eleven dollar purchase-key will cause rotation of the dollar group C' of ratchet-wheels for an angular distance corresponding to the entire path of movement of the dollar purchase-pawl 506 less the distance for which the shield 510 therefor extends across the face of the ratchet-wheel with which said pawl coacts.

The rotation of the dollar group of ratchet-wheels in the purchase denoting operation causes rotation of the dollar group C of cams in the direction of the arrow $d$ for locating the normal zero part of these cam-wheels, which in Fig. 22 are shown in the space 20, in the space 9. The depression of the less-than-dollar purchase-key 401 having the designation "90" thereon causes a rotation of the less-than-dollar ratchet-wheel 409 correlated therewith a distance corresponding to the distance of movement of this pawl less the distance for which the shield 410 thereof extends across said ratchet-wheel, and effecting a rotation of the less-than-dollar group B of cam-wheels in the direction of the arrow $d$, for locating the normal zero portion of these cam-wheels, shown in the space 20 in Fig. 22, in the space 2, and in this movement, through the medium of the single tooth gearing between the less-than-dollar group of cam-wheels and the dollar group of cam-wheels, the dollar group C of cam-wheels will also be retracted a distance of one space in the direction of the arrow $d$, constituting the subtracting carry, whereby the dollar cam-wheels which had, by the depression of the eleven dollar purchase-key been placed in a position to release nine dollars in change, are retracted so as to place its normal zero space into the space 8, exemplified in Fig. 22.

The depression of the penny purchase-key 301 having thereon the designation "1" causes a movement of the ratchet-wheel 309 correlated therewith a distance corresponding to the distance of movement of its pawl less the distance for which the shield 310 thereof extends over said ratchet-wheel, and a rotation of the penny group A of cam-wheels for a distance corresponding to this movement, thereby placing the normal zero line of the penny cam-wheels, shown in the space 20 in Fig. 22, in the space 16. The rotation of this penny group of cam-wheels will in turn, through the medium of the one-toothed gear between the penny group of cam-wheels and the less-than-dollar group of cam-wheels, retract the less-than-dollar cam-wheels in the direction of the arrow $d$ for the distance of one tooth, representing a reducing effect of one nickel, and placing the normal zero portion of these cam-wheels, which had previously been moved into the space 2, in the space 1. By this operation a purchase effect has been accumulated in the cam-wheels of $11.91. The coin-deposit crank being now turned, will have the effect of turning the dog-shaft for successively advancing all of the coin-depositing levers and the auxiliary coin-depositing slides. All of these auxiliary slides will act idle except the auxiliary slides 528 of the five dollar and ten dollar values, which will contact the five dollar and ten dollar coins deposited, as previously explained, and cause actuation of the main slides 523, of said denominations, whereby said main slides are advanced and the five dollar and ten dollar coins deposited respectively in the five dollar and ten dollar coin-receptacles, and whereby, further, the pawls 143, 146, having connection with the five dollar and ten dollar main slides actuate the ratchet-wheels 142, 145, with which they coact for angular distances respectively of a five dollar and a ten dollar coin value in the dollar group of ratchet-wheels, which movement is communicated to the dollar group C of cam-wheels, whereby the parts of said cam-wheels normally in the zero space, shown as the space 20 in Fig. 22, which have previously been moved into the space 8, are now moved in the direction of the arrow $c$ into the space 3. The five dollar and ten dollar main slides also act on the locking levers 576 respectively locking the five dollar and ten dollar segment-gears in place and all locking levers of lower orders, placing these locking levers in unlocking relation, and holding them in such relation by means of the keepers 193 thereon contacting the flat face of the coin-discharging catch-bar 197. The cams which are now placed in the normal or zero space 20 in Fig. 22, denoting a change-giving position of said wheels, represent a coin value of $3.09, for discharging three single dollars, one nickel and four pennies, by means of the coin-discharging mechanism.

The carry from a group of lower order to a group of higher order of cam-wheels accumulating the purchase amount into said cam-wheels, takes place in the subtracting direction of movement of said cam-wheels at the initiation of this subtracting movement in any of the groups of lower orders of cam-wheels. The carry from a group of lower order to a group of higher order of cam-wheels in the coin-deposit movement of said cam-wheels, takes place at the completion of rotation of the cam-wheels of lower order, for instance, if five pennies are deposited, five actuations of the penny group of cam-wheels takes place for moving the one penny, two penny, three penny and four penny cams and the idle portion of said cam-wheels successively into zero position, and, when the idle portion of said cam-wheels arrives in zero position, there is a carry by means of the one-tooth gearing into the lessthan-dollar group B of cam-wheels, for moving said group B of cam-wheels one space, and moving a single nickel cam into the normal zero space represented as 20 in Fig. 22.

Having thus fully described my invention, what I claim as new and desire to secure by Letters Patent, is:

1. In a mechanical cashier, the combination of cam-mechanism, purchase-mechanism and coin-deposit mechanism, the latter two mechanisms having operative connection with said cam-mechanism for operating the same in opposite directions for positioning said cam-mechanism in a position representing the difference in result between said operative effects of said purchase-mechanism and said coin-deposit mechanism, said coin-deposit mechanism comprising coin-deposit wheels of different coin-denominations, and means for automatic successive operation of said coin-deposit wheels of different denominations.

2. In a mechanical cashier, the combination of cam-mechanism, purchase-mechanism and coin-deposit mechanism, the latter two mechanisms having operative connection with said cam-mechanism for operating the same in opposite directions for positioning said cam-mechanism in a position representing the difference in result between said operative effects of said purchase-mechanism and said coin-deposit mechanism, said coin-deposit mechanism comprising coin-deposit wheels of different coin-denominations, means for automatic successive operation of said coin-deposit wheels of different denominations, and coin-delivery mechanism having operative connection with said cam-mechanism for placing said coin-delivery mechanism in a relation corresponding to said difference in result.

3. In a mechanical cashier, the combination of cam-mechanism, purchase-mechanism and coin-deposit mechanism, the latter two mechanisms having operative connection with said cam-mechanism for operating the same in opposite directions for positioning said cam-mechanism in a position representing the difference in result between said operative effects of said purchase mechanism and said coin-deposit mechanism, coin-delivery mechanism having operative connection with said cam-mechanism for placing said coin-delivery mechanism in a relation corresponding to said difference in results, said coin-delivery mechanism comprising an actuating member, and means for locking said actuating member in actuated position.

4. In a mechanical cashier, the combination of cam-mechanism, purchase-mechanism and coin-deposit mechanism, the latter two mechanisms having operative connection with said cam-mechanism for operating the same in opposite directions for positioning said cam-mechanism in a position representing the difference in result between said operative effects of said purchase-mechanism and said coin-deposit mechanism, coin-delivery mechanism comprising positioning members having operative connection with said cam-mechanism for placing the same in relations corresponding to said difference in result and actuating members, and locking-mechanism for normally holding said actuating members in locked relation, said locking mechanism arranged to be acted on by said coin-deposit mechanism for unlocking the same.

5. In a mechanical cashier, the combination of cam-mechanism, purchase-mechanism, and coin-deposit mechanism, said mechanisms being normally in zero positions, the latter two mechanisms having operative connection with said cam-mechanism for operating the same in opposite directions out of zero positions, said coin-deposit mechanism being of different coin-denominations, and means for the automatic successive operation of said coin-deposit mechanisms of different denominations, thereby positioning said cam-mechanism in a position representing the difference between said operative effects of said purchase-mechanism and said coin-deposit mechanism, and means for returning said cam-mechanism to zero position.

6. In a mechanical cashier, the combination of coin-deposit wheels, coin-deposit slides having operative connection with said wheels, a retaining device for said slides, and operating means for said slides and retaining device comprising intermittent gears arranged for first moving said slides and then actuating said retaining device for releasing said slides.

7. In a mechanical cashier, the combination of coin-delivering mechanism, locking means therefor, coin-slides, a retaining device therefor, means between said coin-slides and locking means for selectively releasing said locking means, and operating means for said slides and retaining device for first moving said slides into coin-deposit positions whereby engagement is made with said retaining device for retaining said slides in coin-deposit positions and then releasing said retaining device for return of said slides.

8. In a mechanical cashier, the combination of coin-delivering mechanism, locking means therefor, coin-slides, a retaining device therefor, actuating means between said coin-slides and locking means for selectively releasing said locking means, and operating means for said coin-slides and retaining means comprising intermittent gears first moving said coin-slides into coin-delivering positions and for making engagement with said retaining device for momentarily holding said slides in coin-delivering positions and then actuating said retaining device for release of said slides.

9. In a mechanical cashier, the combination of a pair of coin-slides, a coin-gate operatively located between said slides and arranged for holding a coin between said slides for simultaneous movement of said slides, and means having connection with one of said slides for movement of said pair of slides through the medium of said coin.

10. In a mechanical cashier, the combination of a pair of coin-slides, means for moving one of said slides independent of the other of said slides, coin-receiving means between said coin-slides whereby when a coin is received therein said one of said slides acts on said coin for moving both said coin-slides, said coin-receiving means comprising a coin-releasing part, and means for automatically releasing said coin-releasing part during movement of both said slides.

11. In a mechanical cashier, the combination of a pair of coin-slides, means for moving one of said coin-slides independent of the other of said slides, coin-receiving means between said slides whereby when a coin is received therein said one of said slides acts on said coin for moving both said slides, a coin-receptacle, said coin-receiving means comprising a coin-releasing part, and means at said coin-receptacle for automatic release of said coin-receiving means during movement of both of said slides for discharge of said coin into said receptacle.

12. In a mechanical cashier, the combination of cam-mechanism, purchase mechanism having operative connection therewith, coin-deposit mechanism comprising a pair of coin-slides, coin-receiving means between said slides, means for operating one of said slides, said slide acting on a coin received in said coin-receiving means for operating the other of said slides, and connecting means between said other of said slides and said cam-mechanism for operating the same reversely to the operation thereof by said purchase-mechanism.

13. In a mechanical cashier, the combination of a positioning wheel, a pair of coin-slides, coin-receiving means between said slides comprising a coin-gate mounted for moving with one of said slides, means for operating one of said slides, said slide acting on a coin received in said coin-receiving means for operating the other of said slides, connecting means between said other of said slides and said positioning wheel for positioning said wheel, a coin-receptacle, and releasing means adjacent to said coin-receptacle acting on said coin gate while in motion for releasing the coin therein.

14. In a mechanical cashier, the combination of a series of coin-slides each comprising a main slide and an auxiliary slide, a coin-receptacle for each of said series of coin-slides, said coin-slides respectively provided with coin-receiving means operatively disposed between the main and auxiliary slides thereof, said coin-receiving means comprising a coin-gate mounted for moving with one of said slides, and means for moving said auxiliary slides normally in idle relations past said coin-receiving means, a coin deposited in said coin-receiving means forming operative connection between said auxiliary and main slides for moving both said slides and said coin into coin-deposit position at said receptacle, and means for movement of said coin-gate independently of both said slides for releasing the coin.

15. In a mechanical cashier, the combination of cam-mechanism, purchase-mechanism having operative connection therewith, coin-deposit mechanism comprising a series of coin slides each comprising a main slide and an auxiliary slide, a coin-receptacle for each of said series of coin-slides, said coin-slides respectively provided with coin-receiving means operatively disposed between the main and auxiliary slides thereof, said coin-receiving means comprising a coin-gate mounted for moving with one of said slides, means for moving said auxiliary slides normally in idle relations past said coin-receiving means, means between said main slides and said cam-mechanism for actuating the latter, a coin deposited in said coin-receiving means forming operative connection between said auxiliary and main slides for moving both said slides and said coin into coin-deposit position at said receptacle, and for actuating said cam-mechanism.

16. In a mechanical cashier, the combination of a series of coin-slides each comprising a pair of slides, a coin-receptacle for each of said series of coin-slides, said pairs of slides respectively provided with coin-receiving means operatively disposed between the slides thereof, means for moving one of each of said pairs of slides normally in idle relations past said coin-receiving means, coins deposited in said coin-receiving means forming operative connections between said slides of said pairs of slides for moving both said slides thereof and said coins into coin-deposit position at said receptacles, said coin-receiving means comprising a coin-gate mounted for moving with one of said slides, means for moving said coin-gate independently of both said slides for releasing the coin, coin-delivering means, and operative connections between the other of said slides of said respective pairs of slides and said coin-delivering means whereby said coin-delivering means of said receptacles receiving said coins are placed in coin-delivering relation.

17. In a mechanical cashier, the combination of a series of cams arranged in groups, a series of actuating wheels arranged in corresponding groups, each of said groups of wheels operatively connected with its corresponding group of cams for rotating the latter, coin-deposit mechanism and purchase-keys having operative connections with said respective groups of wheels for rotating the same in opposite directions and thereby positioning said respective groups of cams in positions representing the differences of said operative effects, said coin-deposit mechanism comprising means for automatically successively operating said actuating wheels, and coin-delivering mechanism comprising controlling members controlled according to said positions of said respective groups of cams.

18. In a mechanical cashier, the combination of a series of cams arranged in groups, a series of actuating wheels arranged in corresponding groups, each of said groups of wheels operatively connected with its corresponding group of cams for rotating the latter, coin-deposit mechanism and purchase-keys having operative connections with said respective groups of wheels for rotating the same in opposite directions and thereby positioning said respective groups of cams in positions representing the differences of said operative effects, said coin-deposit mechanism comprising means for automatically successively operating said actuating wheels, coin-delivering mechanism comprising controlling members controlled according to said positions of said respective groups of cams, said groups of cams being of successively higher orders, and transferring means between proximate groups of cams for moving a cam-group of higher order from a cam-group of next lower order.

19. In a mechanical cashier, the combination of a series of cams arranged in groups, a series of actuating wheels arranged in corresponding groups, each of said groups of wheels operatively connected with its corresponding group of cams for rotating the latter, coin-deposit mechanism and purchase-keys having operative connections with said respective groups of wheels for rotating the same in opposite directions and thereby positioning said respective groups of cams in positions representing the differences of said operative effects, coin-delivering mechanism comprising controlling members controlled according to said positions of said respective groups of cams, said groups of cams being of successively higher orders, transferring means between said proximate groups of cams for moving of cam-group of higher order from a cam-group of next lower order, and a star-wheel for each of said groups of cams for returning said cams to zero position.

20. In a mechanical cashier, the combination of a cam-mechanism, coin-deposit elements for respectively depositing coins of different denominations, connecting means between said respective coin-deposit elements and said cam-mechanism for selectively positioning said cam-mechanism according to the coins deposited, and means for operating said coin-deposit elements in automatic succession for depositing the coins of different denominations in sequence.

21. In a mechanical cashier, the combination of a series of coin-deposit elements of different denominations for depositing the coins, means for operating said coin-deposit elements of different denominations in succession comprising a series of dogs arranged for operative connection with said respective coin-depositing members, and means for automatically successively causing operative relation of said dogs with said respective operating means for operating said coin-deposit members successively.

22. In a mechanical cashier, the combination of a series of coin-deposit members, actuating dogs therefor arranged in different radial positions about an operating shaft, and releasable connecting means between said respective dogs and said respective coin-deposit members, and arranged for moving said coin-deposit members in succession.

23. In a mechanical cashier, the combination of a series of coin-deposit members, actuating dogs therefor arranged in different radial positions about an operating shaft, releasable connecting means between said respective dogs and said respective coin-deposit members, and arranged for moving said coin-deposit members in succession, and tripping means for said releasable connecting means.

24. In a mechanical cashier, the combination of a series of coin-deposit members, actuating dogs therefor arranged in different radial positions about an operating shaft, releasable connecting means between said respective dogs and said respective coin-deposit members, and arranged for moving said coin-deposit members in succession, retaining means for said coin-deposit members, and means for releasing said retaining means.

25. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle and arranged for movement of both of said slides of each of said pairs of slides upon deposit of coins in said coin-receiving means, triggers on said levers, and a series of dogs arranged for successive coaction with said triggers for moving said levers.

26. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle and arranged for movement of both of said slides of each of said pairs of slides upon deposit of coins in said coin-receiving means, triggers on said levers, a series of dogs arranged for successive coaction with said triggers for moving said levers, and springs having connection with said triggers for normally retracting said triggers and levers.

27. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle and arranged for movement of both of said slides of each of said pairs of slides upon deposit of coins in said coin-receiving means, triggers on said levers, a series of dogs arranged for successive coaction with said triggers for moving said levers, and tripping means coacting with said triggers.

28. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle, and arranged for movement of both of said slides of each of said pairs of slides upon deposit of coins in said coin-receiving means, triggers on said levers, a series of dogs arranged for successive coaction with said triggers for moving said levers, retaining means for said slides for momentarily retaining said slides in coin-deposit position, and means for releasing said retaining means.

29. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle, and arranged for movement of both of said slides of each of said pairs of slides upon deposit of coins in said coin-receiving means, triggers on said levers, a series of dogs arranged for successive coaction with said triggers for moving said levers, tripping means for said triggers, retaining means for said slides for momentarily retaining said slides in coin-depositing positions during tripping relation of said triggers, and means for releasing said retaining means.

30. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle, and arranged for movement of both of said slides of each of said pairs of slides upon deposit of coins in said coin-receiving means, triggers on said levers, a series of dogs arranged for successive coaction with said triggers for moving said levers, coin-denoting mechanism, the other of said slides of said pairs of slides having operative connections with said coin-denoting mechanism for denoting upon the latter in succession the coins deposited by said respective pairs of slides.

31. In a mechanical cashier, the combination of a series of pairs of coin-deposit slides, the slides of said respective pairs having coin-receiving means therebetween, a series of coin-deposit levers having operative connections with one of said slides of said respective pairs for normally moving said one of said slides idle, and arranged for movement of both of said slides of each of said pairs of slides upon deposit of coins in said coin-receiving means, triggers on said levers, a series of dogs arranged for successive coaction with said triggers for moving said levers, coin-denoting mechanism, the other of said slides of said pairs of slides having operative connections with said coin-denoting mechanism for denoting upon the latter in succession the coins deposited by said respective pairs of slides, said coin-denoting mechanism being arranged in groups of increasing orders, and means for transferring a movement of a group of lower order into an actuation of a group of higher order.

32. In a mechanical cashier, the combination of cam-mechanism, a series of pairs of coin-deposit slides arranged to receive the coins and having right-line movements, said coins forming actuating elements between the slides of said pairs of slides, purchase-keys, a series of coin-deposit ratchet-wheels, a series of purchase ratchet-wheels, coin-deposit pawls operatively connected with said coin-deposit slides, and purchase pawls operatively connected with said purchase-keys, said pawls coacting with said respective ratchet-wheels, and said respective ratchet-wheels operatively connected with said cam-mechanism for moving said cam-mechanism in opposite directions into a position representing the difference in result between said movements.

33. In a mechanical cashier, the combination of cam-mechanism, a series of pairs of coin-deposit slides arranged to receive the coins and having right-line movements, said coins forming elements between the slides of said respective pairs of slides, purchase-keys, a series of coin-deposit ratchet-wheels, a series of purchase ratchet-wheels, coin-deposit pawls operatively connected with said coin-deposit slides, purchase-pawls operatively connected with said purchase keys, said pawls coacting with said respective ratchet-wheels, said respective ratchet-wheels operatively connected with said cam-mechanism for moving said cam-mechanism in opposite directions into a position representing the difference in result between said movements, coin-delivering mechanism, positioning means therefor comprising positioning elements, and controlling levers for said positioning elements having operative connection with said cam-mechanism for being controlled by the position of said cam-mechanism.

34. In a mechanical cashier, the combination of cam-mechanism, a series of coin-deposit slides, purchase-keys, a series of coin-deposit ratchet-wheels, a series of purchase ratchet-wheels, coin-deposit pawls operatively connected with said coin-deposit slides, purchase-pawls operatively connected with said purchase-keys, said pawls coacting with said respective ratchet-wheels, said respective ratchet-wheels operatively connected with said cam-mechanism for moving said cam-mechanism in opposite directions into a position representing the difference in result between said movements, coin-delivering mechanism, positioning means therefor comprising positioning elements, controlling levers for said positioning elements having operative connection with said cam-mechanism for being controlled by the positions of said cam-mechanism, and star-wheels coacting with said cam-mechanism, said cam-mechanism provided with contact parts for said star-wheels for returning said cam-mechanism to zero position.

35. In a mechanical cashier, the combination of coin-deposit mechanism, coin-delivering mechanism, locking levers for said coin-delivering mechanism, a rockable shaft and keepers therefor for retaining said locking levers in unlocking positions, said coin-deposit mechanism having operating means thereon for moving said locking levers into unlocking positions and said keepers into coaction with said rockable shaft, and means for sequentially operating said coin-delivering mechanism and said rockable shaft for delivering the coins and releasing said keepers.

36. In a mechanical cashier, the combination of coin-deposit elements, coin-delivering elements, locking levers for coins of different denominations for said coin-delivering elements, retaining means for retaining said locking levers in unlocking positions, said coin-deposit elements provided with means coacting with said locking levers for placing said locking levers for coins of different denominations automatically consecutively in unlocking positions, and means for operating said coin-delivering mechanism and tripping said retaining means.

37. In a mechanical cashier, the combination of coin-deposit elements, coin-delivering elements, a locking lever for said coin-delivering elements, retaining means for retaining said locking lever in unlocking position, said coin-deposit elements provided with means coacting with said locking lever for placing said locking lever in unlocking position, and means comprising intermittent gears having operating parts for moving said coin-delivering mechanism and tripping said retaining means in succession.

38. In a mechanical cashier, the combination of a coin-delivering mechanism comprising a coin-delivering shaft, a spiral-gear, a change-denoting mechanism, controlling means between said change-denoting mechanism and said spiral-gear for controlling one limit of movement of said spiral-gear, a coin-delivering finger, a spiral-pinion meshing with said spiral-gear for rotating said finger, and means for operating said spiral-gear in a coin-delivering movement whereby the coins are discharged.

39. In a mechanical cashier, the combination of a coin-delivering mechanism comprising a coin-delivering shaft, a segment-gear, a change-denoting mechanism, controlling means between said change-denoting mechanism and said segment-gear for controlling one limit of movement of said segment-gear, means for operating said segment-gear in a coin-delivering movement, said segment-gear having operative connection with said coin-delivering shaft, a coin-deposit mechanism, and locking means for said segment-gear controlled by said coin-deposit mechanism.

40. In a mechanical cashier, the combination of a coin-delivering mechanism comprising a coin-delivering shaft, a segment-gear, a change-denoting mechanism, controlling means between said change-denoting mechanism and said segment-gear for controlling one limit of movement of said segment-gear, and means for operating said segment-gear in a coin-delivering movement, said segment-gear having operative connection with said coin-delivering shaft, a coin-deposit mechanism, locking means for said segment-gear controlled by said coin-deposit mechanism, and retaining means for retaining said locking means in unlocking position.

41. In a mechanical cashier, the combination of a coin-delivering mechanism comprising a coin-delivering shaft, a segment-gear, a change-denoting mechanism, controlling means between said change-denoting mechanism and said segment-gear for controlling one limit of movement of said segment-gear, means for operating said segment-gear in a coin-delivering movement, said segment-gear having operative connection with said coin-delivering shaft, a coin-deposit mechanism, locking means for said segment-gear controlled by said coin-deposit mechanism, retaining means for retaining said locking means in unlocking position, and actuating means for successively actuating said segment-gear and releasing said retaining means.

42. In a mechanical cashier, the combination of a coin-delivering mechanism comprising a coin-delivering shaft, a segment-gear, a change-denoting mechanism, controlling means between said change-denoting mechanism and said segment-gear for controlling one limit of movement of said segment-gear, means for operating said segment-gear in a coin-delivering movement, said segment-gear having operative connection with said coin-delivering shaft, a coin-deposit mechanism, locking means for said segment-gear controlled by said coin-deposit mechanism, retaining means for retaining said locking means in unlocking position, and actuating means comprising intermittent gearing successively actuating said segment-gear and releasing said retaining means.

43. In a mechanical cashier, the combination of a coin-delivering mechanism comprising a coin-delivering shaft, a segment-gear, a change-denoting mechanism, controlling means between said change-denoting mechanism and said segment-gear for controlling one limit of movement of said segment-gear, means for operating said segment-gear in a coin-delivering movement, said segment-gear having operative connection with said coin-delivering shaft, a coin-deposit mechanism, locking means for said segment-gear controlled by said coin-deposit mechanism, retaining means for retaining said locking means in unlocking position, returning means for returning said coin-denoting mechanism to normal position, and means comprising intermittent gears having operative connection with said segment-gear, said returning means and said retaining means for successively returning said means to normal positions in the order named.

44. In a mechanical cashier, the combination of a coin-delivering mechanism comprising a coin-delivering segment-gear, coin-denoting mechanism, a coin-delivering finger, a coin-discharging shaft having operative connection with said segment-gear, a ratchet and ratchet-wheel between said shaft and finger, controlling means between said coin-denoting mechanism and segment-gear for selectively controlling a limit of idle movement of said segment-gear, said last-named movement causing idle movement between said ratchet and ratchet-wheel, and actuating means for said segment-gear for moving said coin-delivering shaft, ratchet and ratchet-wheel in coin-delivering direction.

45. In a mechanical cashier, the combination of cam-mechanism comprising cams, means for moving said cams into change-denoting positions, coin-delivering mechanism comprising a segment-gear, a coin-delivering part geared therewith, said segment-gear provided with a flange, pins on said flange coördinate with said cams, controlling levers controlled by said cams and coacting with said respective pins for limiting movement of said segment-gear in one direction, and means for moving said segment-gear in the opposite direction for delivering the coin.

46. In a mechanical cashier, the combination of cam-mechanism comprising cams, means for moving said cams into change-denoting positions, coin-delivering mechanism comprising a segment-gear, a coin-delivering part geared therewith, said segment-gear provided with a flange, pins on said flange coördinate with said cams, controlling levers controlled by said cams and coacting with said respective pins for limiting movement of said segment-gear in one direction, means for moving said segment-gear in the opposite direction for delivering the coin, a locking lever having operative connection with said segment-gear for locking the same, a coin-deposit mechanism having operative connection with said locking lever for unlocking the same, and means for returning said locking lever into locking relation.

47. In a mechanical cashier, the combination of cam-mechanism comprising cams, and means for moving said cams into change-denoting positions, coin-delivering mechanism comprising a segment-gear, a coin-delivering part geared therewith, said segment-gear provided with a flange, pins on said flange coördinate with said cams, controlling levers controlled by said cams and coacting with said respective pins for limiting movement of said segment-gear in one direction, means for moving said segment-gear in the opposite direction for delivering the coin, a rocker-shaft about which said segment-gear is pivoted, and an actuating part for said segment-gear secured to said rocker-shaft.

48. In a mechanical cashier, the combination of a series of coin-deposit means arranged for depositing coins of different denominations, coin-delivering means arranged for delivering coins of different denominations, locking levers for coins of different denominations coacting with said respective delivering means, said coin-deposit means provided with actuating means for said locking levers, and connecting means between locking levers of proximate orders arranged for connected movement of a locking lever of a given order and of locking levers of lower order and for idle movement between said locking lever of a given order and the locking lever of next higher order.

49. In a mechanical cashier, the combination of coin-deposit means of different orders, coin-delivering means of different orders, locking levers of different orders coacting respectively between coin-deposit means and coin-delivering means of given orders, the locking levers of proximate orders having lug and recess connection therebetween forming spaced connection between proximate levers and arranged for connected movement of a given lever and of levers of lower orders and for idle movement between said given lever and the lever of next higher order.

50. In a mechanical cashier, the combination of a cam-mechanism, coin-deposit mechanism comprising a series of coin-deposit pawls of different orders and actuating means therefor for operating said coin-deposit pawls of different orders automatically in sequence, said pawls and actuating means having coin-deposit parts therebetween arranged for operatively connecting said coin-deposit pawls and said operating means upon deposit of coins in said respective coin-deposit parts, ratchet-wheels coacting with said respective pawls, actuating means between said ratchet-wheels and cam-mechanism, and shields between said ratchet-wheels and pawls for controlling the actuating effects of said pawls upon said ratchet wheels and cam-mechanism.

51. In a mechanical cashier, the combination of a series of coin-deposit ratchet-wheels and purchase ratchet-wheels having peripheral ratchet-teeth, coin-deposit pawls and purchase-pawls coöperating with said respective ratchet-teeth throughout a portion of the circles in which said peripheral teeth are located, coin-delivering mechanism comprising settable parts for controlling coin delivery, and cam-wheels for setting said settable parts geared to said ratchet-wheels for rotating said cam-wheels at a materially less ratio for causing complete rotation of said cam-wheels for complete setting of said settable parts during partial rotation of said ratchet-wheels.

52. In a mechanical cashier, the combination of coin-receptacles, a series of coin-deposit chutes, change-denoting means, coin-moving means having operative connection with said change-denoting means and provided with coin-receiving parts in line with said chutes, actuating means for said coin-moving means for depositing coins in said coin-receiving parts into said coin-receptacles, auxiliary coin-chutes communicating with said receptacles, a closing-bar provided with coin-slots for said respective auxiliary chutes, means for causing registry between said coin-slots and auxiliary chutes, and means for locking said bar in position with said coin-slots out of registry with said auxiliary coin-chutes.

53. In a mechanical cashier, the combination of coin-receptacles, coin-delivering means comprising coin-discharging fingers coacting with said receptacles, shafts with which said respective fingers have connection, a gear on each of said shafts, a coin-emptying shaft for each of said last-named shafts, a gear thereon for each of said last-named gears, a part comprising apertures for access to said emptying shafts, a closing-bar having apertures therein, and means for moving said closing-bar for causing said last-named apertures to register with said first-named apertures, and means for locking said closing-bar in position with said apertures therein out of registry with said first-named apertures.

54. In a mechanical cashier, the combination of coin-receptacles, coin-delivering means comprising coin-discharging fingers coacting with said receptacles, shafts with which said respective fingers have connection, a gear on each of said shafts, a coin-emptying shaft for each of said last-named shafts, a gear thereon for each of said last-named gears, a part comprising apertures for access to said emptying shafts, a closing-bar having apertures therein, and means for moving said closing-bar for causing said last-named apertures to register with said first-named apertures, means for locking said closing-bar in position with said apertures therein out of registry with said first-named apertures, and means for moving said last-named gears into and out of mesh with said first-named gears.

55. In a mechanical cashier, the combination of coin-receptacles, coin-delivering means comprising coin-discharging fingers coacting with said receptacles, shafts with which said respective fingers have connection, a gear on each of said shafts, a coin-emptying shaft for each of said last-named shafts, a gear thereon for each of said last-named gears, a part comprising apertures for access to said emptying shafts, a closing-bar having apertures therein, and means for moving said closing-bar for causing said last-named apertures to register with said first-named apertures, and means for locking said closing-bar in position with said apertures therein out of registry with said first-named apertures, means for moving said last-named gears into and out of mesh with said first-named gears, said last-named means and said closing-bar being connected for combined movement.

In testimony whereof, I have hereunto signed my name in the presence of two subscribing witnesses.

ROBERT H. BUTER.

Witnesses:
COLEMAN AVERY,
JACOB A. HOLLANDER.

Copies of this patent may be obtained for five cents each, by addressing the "Commissioner of Patents, Washington, D. C."